(12) United States Patent
Lopez et al.

(10) Patent No.: US 12,130,500 B2
(45) Date of Patent: Oct. 29, 2024

(54) MULTIPLE DEGREE OF FREEDOM HINGE SYSTEMS AND EYEWEAR DEVICES COMPRISING SUCH HINGE SYSTEMS

(71) Applicant: MAGIC LEAP, INC., Plantation, FL (US)

(72) Inventors: Alejandro Lopez, Pembroke Pines, FL (US); Andrew C. Duenner, Houston, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/339,894

(22) Filed: Jun. 22, 2023

(65) Prior Publication Data
US 2023/0333406 A1     Oct. 19, 2023

Related U.S. Application Data

(63) Continuation of application No. 17/177,400, filed on Feb. 17, 2021, now Pat. No. 11,726,347.

(60) Provisional application No. 62/978,076, filed on Feb. 18, 2020.

(51) Int. Cl.
*G02C 5/22* (2006.01)
*G02B 27/01* (2006.01)

(52) U.S. Cl.
CPC ........... *G02C 5/22* (2013.01); *G02B 27/0172* (2013.01); *G02B 27/0176* (2013.01); *G02C 5/2263* (2013.01); *G02B 2027/0178* (2013.01)

(58) Field of Classification Search
CPC .... G02C 5/22; G02C 5/2263; G02B 27/0172; G02B 27/0176; G02B 2027/0178
USPC .......................................... 359/630; 345/7–9
See application file for complete search history.

(56) References Cited

U.S. PATENT DOCUMENTS

| | | |
|---|---|---|
| 9,482,883 B1 | 11/2016 | Meisenholder |
| 2008/0074609 A1 | 3/2008 | Ifergan |
| 2012/0257126 A1 | 10/2012 | Ohno et al. |
| 2014/0168599 A1 | 6/2014 | Vossoughi et al. |
| 2015/0178939 A1 | 6/2015 | Bradski et al. |
| 2018/0052320 A1 | 2/2018 | Curtis et al. |
| 2018/0348529 A1 | 12/2018 | Blum et al. |
| 2019/0361265 A1 | 11/2019 | Sonthonnax et al. |

FOREIGN PATENT DOCUMENTS

| | | |
|---|---|---|
| EP | 0067110 A2 | 12/1982 |
| JP | 5907781 B2 | 4/2016 |
| JP | 2019113839 | 7/2019 |

OTHER PUBLICATIONS

Non-Final Office Action for U.S. Appl. No. 17/177,400 dated Dec. 8, 2022.
Amendment Response to NFOA for U.S. Appl. No. 17/177,400 dated Mar. 8, 2023.

(Continued)

*Primary Examiner* — William Choi
(74) *Attorney, Agent, or Firm* — Vista IP Law Group, LLP

(57) ABSTRACT

A multiple degree of freedom hinge system is provided, which is particularly well adapted for eyewear, such as spatial computing headsets. In the context of such spatial computing headsets having an optics assembly supported by opposing temple arms, the hinge system provides protection against over-extension of the temple arms or extreme deflections that may otherwise arise from undesirable torsional loading of the temple arms. The hinge systems also allow the temple arms to splay outwardly to enable proper fit and enhanced user comfort.

18 Claims, 18 Drawing Sheets

(56) References Cited

OTHER PUBLICATIONS

Notice of Allowance for U.S. Appl. No. 17/177,400 dated Mar. 27, 2023.
PCT International Search Report and Written Opinion for International Appln. No. PCT/US21/18299, Applicant Magic Leap, Inc., dated May 21, 2021 (17 pages).
Partial European Search Report for EP Patent Appln. No. 21756594.4 Jun. 28, 2023.
Extended European Search Report for EP Patent Appln. No. 21756594.4 Oct. 4, 2023.
Foreign NOA for JP Patent Appln. No. 2022-549319 dated Jun. 21, 2024.
Foreign OA Response for JP Patent Appln. No. 2022-549319 dated Jun. 13, 2024.
Foreign OA for JP Patent Appln. No. 2022-549319 dated Mar. 13, 2024 (with English translation).
Foreign Response for EP Patent Appln. No. 21756594.4 dated Apr. 24, 2024.

MULTIPLE DEGREE OF FREEDOM HINGE SYSTEMS AND EYEWEAR DEVICES COMPRISING SUCH HINGE SYSTEMS

CROSS REFERENCE TO RELATED APPLICATION(S)

The present application is a continuation of pending U.S. patent application Ser. No. 17/177,400, filed on Feb. 17, 2021 and entitled "MULTIPLE DEGREE OF FREEDOM HINGE SYSTEMS AND EYEWEAR DEVICES COMPRISING SUCH HINGE SYSTEMS", which claims the benefit of U.S. Provisional Patent Application Ser. No. 62/978,076, filed on Feb. 18, 2020 and entitled "MULTIPLE DEGREE OF FREEDOM HINGE SYSTEMS and EYEWEAR DEVICES COMPRISING SUCH HINGE SYSTEMS". The contents of the aforementioned U.S. patent application, and U.S. provisional patent application are hereby explicitly and fully incorporated by reference in their entireties for all purposes, as though set forth in the present disclosure in full.

TECHNICAL FIELD

This disclosure generally relates to hinge systems and, more particularly, to multiple degree of freedom hinge systems that are particularly well adapted to support the temple arms of eyewear devices, including spatial computing headsets. The disclosure also relates to eyewear devices comprising such hinge systems.

DESCRIPTION OF THE RELATED ART

Spatial computing headsets, including virtual reality (VR), augmented reality (AR), mixed reality (MR), and extended reality (XR) headsets, have proven invaluable for many applications, spanning the fields of scientific visualization, medicine and military training, engineering design and prototyping, tele-manipulation and tele-presence, and personal entertainment systems. In spatial computing headsets, virtual or augmented scenes are displayed to a user via an optics assembly that is positionable and securable to a user's head in front of the user's eyes. Many different systems and techniques exist for supporting such headsets on a user's head, including various structures having hingedly connected temple arms. However, such systems and techniques may suffer from various drawbacks. For example, known systems may be overly complex, bulky, lack precision and/or include a limited range of motion.

SUMMARY

Embodiments described herein provide multiple degrees of freedom hinge systems that are particularly well adapted to support the temple arms of eyewear devices, including spatial computing headsets. In the context of spatial computing headsets having an optics assembly supported by opposing temple arms, the multiple degree of freedom hinge systems may provide protection against over-extension of the temple arms or extreme deflections that may otherwise arise from undesirable torsional loading of the temple arms (e.g., twisting one temple arm up and one temple arm down). For example, the multiple degree of freedom hinge systems may allow the temple arms of eyewear devices (e.g., spatial computing headsets) to rotate about at least two different axes of rotation, namely, a pitch axis and a yaw axis, to decouple forces imposed to the temple arms from, for example, the structure of the eyewear devices forward of the hinge division (e.g., the optics assembly), manipulation of the eyewear devices, etc.

According to one embodiment, an eyewear device may be summarized as including: an optics assembly; a pair of opposing temple arms; and a pair of hinge systems, each hinge system coupling a respective one of the pair of opposing temple arms to the optics assembly. Each hinge system may include: a hinge base fixedly coupled to the optics assembly; an intermediate hinge member rotatably coupled to the hinge base to rotate about a pitch axis; and a distal hinge member rotatably coupled to the intermediate hinge member to rotate about a yaw axis and fixedly coupled to the respective one of the pair of temple arms.

The hinge base may include a biasing member configured to rotationally bias the intermediate hinge member about the pitch axis toward a neutral configuration when the intermediate hinge member is displaced from the neutral configuration. The hinge base may include a generally planar structure with an internal cavity that accommodates the biasing member. The hinge base may include a generally planar base element with the biasing member integrally formed therein. The hinge base may further include opposing covers fixedly secured to the generally planar base element to substantially conceal the biasing member within an internal cavity of the hinge base. At least one of the opposing covers may include an arcuate guide to assist in guiding the intermediate hinge member as the intermediate hinge member rotates relative to the hinge base about the pitch axis.

The hinge base may include a bushing aligned with the pitch axis, and the intermediate hinge member may be pivotably mounted about the bushing to pitch up and down about the pitch axis. Clearance may be provided between the bushing and the intermediate hinge member to enable some translational displacement of the intermediate hinge member relative to the hinge base. For example, the clearance may be a circumferential gap having a gap distance of at least 0.25 mm.

The hinge base and the intermediate hinge member of the hinge system may include one or more stop arrangements to limit rotational travel of the intermediate hinge member relative to the hinge base about the pitch axis.

In some instances, the one or more stop arrangements may include a first rotational stop provided on the hinge base that is configured to impede a path of the intermediate hinge member when the intermediate hinge member pitches up to an upward limit and a second rotational stop provided on the hinge base that is configured to impede the path of the intermediate hinge member when the intermediate hinge member pitches down to a downward limit. The first and second rotational stops may be provided by portions of an arcuate slot provided in the hinge base that impede a path of the intermediate hinge member or structure extending therefrom when the intermediate hinge member pitches up and down to the upward limit and the downward limit, respectively.

In some instances, the one or more stop arrangements may include a first rotational stop provided on the intermediate hinge member that is configured to abut the hinge base when the intermediate hinge member pitches up to an upward limit and a second rotational stop provided on the intermediate hinge member that is configured to abut the hinge base when the intermediate hinge member pitches down to a downward limit. The first and second rotational stops may be provided by peripheral edges of the intermediate hinge member. The first and second rotational stops may serve as backup stops in the event of failure of primary rotational stops provided by the base hinge.

The hinge base may include arcuate guides and the intermediate hinge member may include or otherwise interact with corresponding guide pins that ride in the arcuate guides of the hinge base as the intermediate hinge member rotates relative to the hinge base about the pitch axis. Clearance may be provided between a profile of the arcuate guides and the corresponding guide pins to enable some translational displacement of the intermediate hinge member relative to the hinge base. For example, the clearance may be a circumferential gap having a gap distance of at least 0.25 mm.

The hinge systems may be configured to enable the pair of temple arms to pitch up and down from a neutral configuration at least five degrees in each rotational direction about the pitch axis, or at least ten degrees, or more.

A biasing member (e.g., cantilevered spring) may be positioned between the distal hinge member and the intermediate hinge member to bias the distal hinge member toward a neutral configuration in which the pair of temple arms are biased towards a retracted configuration.

The intermediate hinge member and the distal hinge member of the hinge system may include one or more stop arrangements to limit rotational travel of the distal hinge member relative to the intermediate hinge member about the yaw axis.

In some instances, the one or more stop arrangements may include a first rotational stop provided on the intermediate hinge member that is configured to impede a path of the distal hinge member when the distal hinge member yaws to an outward limit and a second rotational stop provided on the intermediate hinge member that is configured to impede the path of the distal hinge member when the distal hinge member yaws to an inward limit. The first and second rotational stops may be provided by opposing portions of a plate structure of the intermediate hinge member that impede the path of the distal hinge member when the distal hinge member yaws to the outward limit and the inward limit, respectively.

In some instances, the one or more stop arrangements may include a first rotational stop provided on the distal hinge member that is configured to abut the intermediate hinge member when the distal hinge member yaws to an outward limit and a second rotational stop provided on the distal hinge member that is configured to abut the intermediate hinge member when the distal hinge member yaws to an inward limit. The first and second rotational stops may be provided by distinct portions of the distal hinge member that are configured to abut opposing sides of the intermediate hinge member.

The hinge systems may be configured to enable the pair of temple arms to yaw outwardly at least fifteen degrees, or at least twenty degrees, or more.

Each hinge system may be substantially concealed within the optics assembly and temple arm members of the eyewear device. The hinge system may be configured to maintain a flexible circuit passage within a respective joint area of the eyewear device from a leading end of the hinge system to a trailing end of the hinge system throughout manipulation of the hinge system. The flexible circuit passage may be a void between the hinge system and a housing of the eyewear that runs along a length of the hinge system from the leading end to the trailing end.

Although the aforementioned embodiments are disclosed in the context of eyewear, it is appreciated that embodiments of the hinge systems disclosed herein, or aspects or features of the same, may be well suited for a variety of other devices comprising one or more hinged connections. Accordingly, a hinge system may be summarized as including a hinge base fixedly couplable to a first member; an intermediate hinge member rotatably coupled to the hinge base to rotate about a pitch axis; and a distal hinge member rotatably coupled to the intermediate hinge member to rotate about a yaw axis and fixedly couplable to a second member, wherein the hinge system enables the second member to pitch and yaw relative to the first member. The first and second members may be a wide variety of different structures in which a hinged connection with multiple degrees of freedom is desirable. The hinge system may include some or all of the features previously described in connection with the aforementioned eyewear embodiments.

Summary Recitation of Some Embodiments of the Disclosure

1. An eyewear device, comprising: an optics assembly; a pair of opposing temple arms; and a pair of hinge systems, each hinge system coupling a respective one of the pair of opposing temple arms to the optics assembly, and each hinge system including: a hinge base fixedly coupled to the optics assembly; an intermediate hinge member rotatably coupled to the hinge base to rotate about a pitch axis; and a distal hinge member rotatably coupled to the intermediate hinge member to rotate about a yaw axis and fixedly coupled to the respective one of the pair of temple arms.

2. The eyewear device of claim 1, wherein the hinge base includes a biasing member configured to rotationally bias the intermediate hinge member about the pitch axis toward a neutral configuration when the intermediate hinge member is displaced from the neutral configuration.

3. The eyewear device of claim 2, wherein the hinge base comprises a generally planar structure with an internal cavity that accommodates the biasing member.

4. The eyewear device of claim 2, wherein the hinge base comprises a generally planar base element with the biasing member integrally formed therein.

5. The eyewear device of claim 4, wherein the hinge base further comprises opposing covers fixedly secured to the generally planar base element to substantially conceal the biasing member within an internal cavity of the hinge base.

6. The eyewear device of claim 5, wherein at least one of the opposing covers includes an arcuate guide to assist in guiding the intermediate hinge member as the intermediate hinge member rotates relative to the hinge base about the pitch axis.

7. The eyewear device of claim 1, wherein the hinge base includes a bushing aligned with the pitch axis, and the intermediate hinge member is pivotably mounted about the bushing to pitch up and down about the pitch axis.

8. The eyewear device of claim 7, wherein clearance is provided between the bushing and the intermediate hinge member to enable some translational displacement of the intermediate hinge member relative to the hinge base.

9. The eyewear device of claim 1, wherein the hinge base and the intermediate hinge member of the hinge system include one or more stop arrangements to limit rotational travel of the intermediate hinge member relative to the hinge base about the pitch axis.

10. The eyewear device of claim 9, wherein the one or more stop arrangements comprise a first rotational stop provided on the hinge base that is configured to impede a path of the intermediate hinge member when the intermediate hinge member pitches up to an upward limit and a second rotational stop provided on the hinge base that is configured to impede the path of the intermediate hinge member when the intermediate hinge member pitches down to a downward limit.

11. The eyewear device of claim 10, wherein the first and second rotational stops are provided by portions of an arcuate slot provided in the hinge base that impede a path of the intermediate hinge member when the intermediate hinge member pitches up and down to the upward limit and the downward limit, respectively.

12. The eyewear device of claim 9, wherein the one or more stop arrangements comprise a first rotational stop provided on the intermediate hinge member that is configured to abut the hinge base when the intermediate hinge member pitches up to an upward limit and a second rotational stop provided on the intermediate hinge member that is configured to abut the hinge base when the intermediate hinge member pitches down to a downward limit.

13. The eyewear device of claim 12, wherein the first and second rotational stops are provided by peripheral edges of the intermediate hinge member.

14. The eyewear device of claim 13, wherein the first and second rotational stops serve as backup stops in the event of failure of primary rotational stops provided by the base hinge.

15. The eyewear device of claim 1, wherein the hinge base includes arcuate guides and the intermediate hinge member includes or interacts with corresponding guide pins that ride in the arcuate guides of the hinge base as the intermediate hinge member rotates relative to the hinge base about the pitch axis.

16. The eyewear device of claim 15, wherein clearance is provided between a profile of the arcuate guides and the corresponding guide pins to enable some translational displacement of the intermediate hinge member relative to the hinge base.

17. The eyewear device of claim 1, wherein the hinge systems are configured to enable the pair of temple arms to pitch up and down from a neutral configuration at least five degrees in each rotational direction about the pitch axis.

18. The eyewear device of claim 1, wherein the hinge systems are configured to enable the pair of temple arms to pitch up and down from a neutral configuration at least ten degrees in each rotational direction about the pitch axis.

19. The eyewear device of claim 1, wherein a biasing member is positioned between the distal hinge member and the intermediate hinge member to bias the distal hinge member toward a neutral configuration in which the pair of temple arms are biased towards a retracted configuration.

20. The eyewear device of claim 1, wherein the intermediate hinge member and the distal hinge member of the hinge system include one or more stop arrangements to limit rotational travel of the distal hinge member relative to the intermediate hinge member about the yaw axis.

21. The eyewear device of claim 20, wherein the one or more stop arrangements comprise a first rotational stop provided on the intermediate hinge member that is configured to impede a path of the distal hinge member when the distal hinge member yaws to an outward limit and a second rotational stop provided on the intermediate hinge member that is configured to impede the path of the intermediate hinge member when the intermediate hinge member yaws to an inward limit.

22. The eyewear device of claim 21, wherein the first and second rotational stops are provided by opposing portions of a plate structure of the intermediate hinge member that impede the path of the distal hinge member when the intermediate hinge member yaws to the outward limit and the inward limit, respectively.

23. The eyewear device of claim 20, wherein the one or more stop arrangements comprise a first rotational stop provided on the distal hinge member that is configured to abut the intermediate hinge member when the distal hinge member yaws to an outward limit and a second rotational stop provided on the distal hinge member that is configured to abut the intermediate hinge member when the distal hinge member yaws to an inward limit.

24. The eyewear device of claim 23, wherein the first and second rotational stops are provided by distinct portions of the distal hinge member that are configured to abut opposing sides of the intermediate hinge member.

25. The eyewear device of claim 1, wherein the hinge systems are configured to enable the pair of temple arms to yaw outwardly at least fifteen degrees.

26. The eyewear device of claim 1, wherein the hinge systems are configured to enable the pair of temple arms to yaw outwardly at least twenty degrees.

27. The eyewear device of claim 1, wherein each hinge system is substantially concealed within the optics assembly and temple arm members of the eyewear device.

28. The eyewear device of claim 27, wherein the hinge system is configured to maintain a flexible circuit passage within a respective joint area of the eyewear device from a leading end of the hinge system to a trailing end of the hinge system throughout manipulation of the hinge system.

29. The eyewear device of claim 28, wherein the flexible circuit passage is a void between the hinge system and a housing of the eyewear that runs along a length of the hinge system from the leading end to the trailing end.

30. A hinge system, comprising: a hinge base fixedly couplable to a first member; an intermediate hinge member rotatably coupled to the hinge base to rotate about a pitch axis; and a distal hinge member rotatably coupled to the intermediate hinge member to rotate about a yaw axis and fixedly couplable to a second member, wherein the hinge system enables the second member to pitch and yaw relative to the first member.

31. The hinge system of claim 30, wherein the hinge base includes a biasing member configured to rotationally bias the intermediate hinge member about the pitch axis toward a neutral configuration when the intermediate hinge member is displaced from the neutral configuration.

32. The hinge system of claim 31, wherein the hinge base comprises a generally planar structure with an internal cavity that accommodates the biasing member.

33. The hinge system of claim 31, wherein the hinge base comprises a generally planar base element with the biasing member integrally formed therein.

34. The hinge system of claim 33, wherein the hinge base further comprises opposing covers fixedly secured to the generally planar base element to substantially conceal the biasing member within an internal cavity of the hinge base.

35. The hinge system of claim 34, wherein at least one of the opposing covers includes an arcuate guide to assist in guiding the intermediate hinge member as the intermediate hinge member rotates relative to the hinge base about the pitch axis.

36. The hinge system of claim 30, wherein the hinge base includes a bushing aligned with the pitch axis, and the intermediate hinge member is pivotably mounted about the bushing to pitch up and down about the pitch axis.

37. The hinge system of claim 36, wherein clearance is provided between the bushing and the intermediate hinge member to enable some translational displacement of the intermediate hinge member relative to the hinge base.

38. The hinge system of claim 30, wherein the hinge base and the intermediate hinge member of the hinge system include one or more stop arrangements to limit rotational travel of the intermediate hinge member relative to the hinge base about the pitch axis.

39. The hinge system of claim 38, wherein the one or more stop arrangements comprise a first rotational stop provided on the hinge base that is configured to impede a path of the intermediate hinge member when the intermediate hinge member pitches up to an upward limit and a second rotational stop provided on the hinge base that is configured to impede the path of the intermediate hinge member when the intermediate hinge member pitches down to a downward limit.

40. The hinge system of claim 39, wherein the first and second rotational stops are provided by portions of an arcuate slot provided in the hinge base that impede a path of the intermediate hinge member when the intermediate hinge member pitches up and down to the upward limit and the downward limit, respectively.

41. The hinge system of claim 38, wherein the one or more stop arrangements comprise a first rotational stop provided on the intermediate hinge member that is configured to abut the hinge base when the intermediate hinge member pitches up to an upward limit and a second rotational stop provided on the intermediate hinge member that is configured to abut the hinge base when the intermediate hinge member pitches down to a downward limit.

42. The hinge system of claim 41, wherein the first and second rotational stops are provided by peripheral edges of the intermediate hinge member.

43. The hinge system of claim 42, wherein the first and second rotational stops serve as backup stops in the event of failure of primary rotational stops provided by the base hinge.

44. The hinge system of claim 30, wherein the hinge base includes arcuate guides and the intermediate hinge member includes or interacts with corresponding guide pins that ride in the arcuate guides of the hinge base as the intermediate hinge member rotates relative to the hinge base about the pitch axis.

45. The hinge system of claim 44, wherein clearance is provided between a profile of the arcuate guides and the corresponding guide pins to enable some translational displacement of the intermediate hinge member relative to the hinge base.

46. The hinge system of claim 30, wherein the hinge systems are configured to enable the second member to pitch up and down from a neutral configuration at least five degrees in each rotational direction about the pitch axis.

47. The hinge system of claim 30, wherein the hinge systems are configured to enable the second member to pitch up and down from a neutral configuration at least ten degrees in each rotational direction about the pitch axis.

48. The hinge system of claim 30, wherein a biasing member is positioned between the distal hinge member and the intermediate hinge member to bias the distal hinge member toward a neutral configuration.

49. The hinge system of claim 30, wherein the intermediate hinge member and the distal hinge member of the hinge system include one or more stop arrangements to limit rotational travel of the distal hinge member relative to the intermediate hinge member about the yaw axis.

50. The hinge system of claim 49, wherein the one or more stop arrangements comprise a first rotational stop provided on the intermediate hinge member that is configured to impede a path of the distal hinge member when the distal hinge member yaws to an outward limit and a second rotational stop provided on the intermediate hinge member that is configured to impede the path of the distal hinge member when the distal hinge member yaws to an inward limit.

51. The hinge system of claim 50, wherein the first and second rotational stops are provided by opposing portions of a plate structure of the intermediate hinge member that impede the path of the distal hinge member when the distal hinge member yaws to the outward limit and the inward limit, respectively.

52. The hinge system of claim 49, wherein the one or more stop arrangements comprise a first rotational stop provided on the distal hinge member that is configured to abut the intermediate hinge member when the distal hinge member yaws to an outward limit and a second rotational stop provided on the distal hinge member that is configured to abut the intermediate hinge member when the distal hinge member yaws to an inward limit.

53. The hinge system of claim 52, wherein the first and second rotational stops are provided by distinct portions of the distal hinge member that are configured to abut opposing sides of the intermediate hinge member.

54. The hinge system of claim 30, wherein the hinge system is configured to enable the second member to yaw at least fifteen degrees.

55. The hinge system of claim 30, wherein the hinge system is configured to enable the second member to yaw outwardly at least twenty degrees.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with eyewear, including spatial computing headsets, and hinge systems for temple arms of eyewear have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual reality (VR), augmented reality (AR), mixed reality (MR), and extended reality (XR) systems have not been shown or described in detail to avoid unnecessarily obscuring descriptions of the embodiments. It shall be note that the terms virtual reality (VR), augmented reality (AR), mixed reality (MR), and extended reality (XR) may be used interchangeably in the present disclosure to denote a method or system for displaying at least virtual contents to a user via at least a wearable optics assembly 12 described herein.

Unless the context requires otherwise, throughout the specification and claims which follow, the word "comprise" and variations thereof, such as, "comprises" and "comprising" are to be construed in an open, inclusive sense that is as "including, but not limited to."

Figure 1:
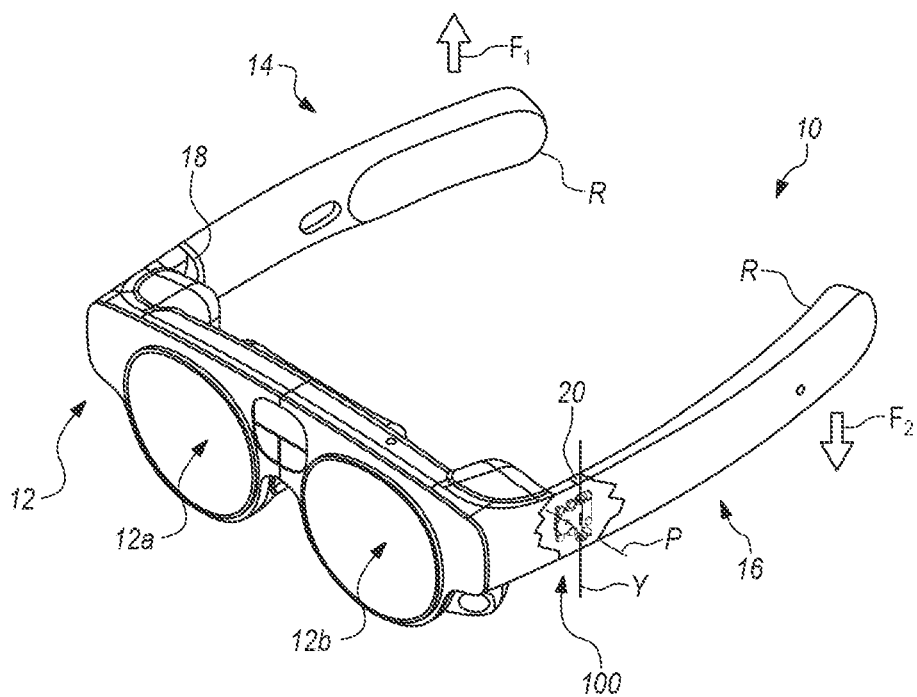
FIG. 1 is an isometric view of eyewear in the form of a spatial computing headset including a pair of temple arms connected by hinge systems, according to one example embodiment, with the temple arms of the headset shown in a retracted configuration.
Figure 2:
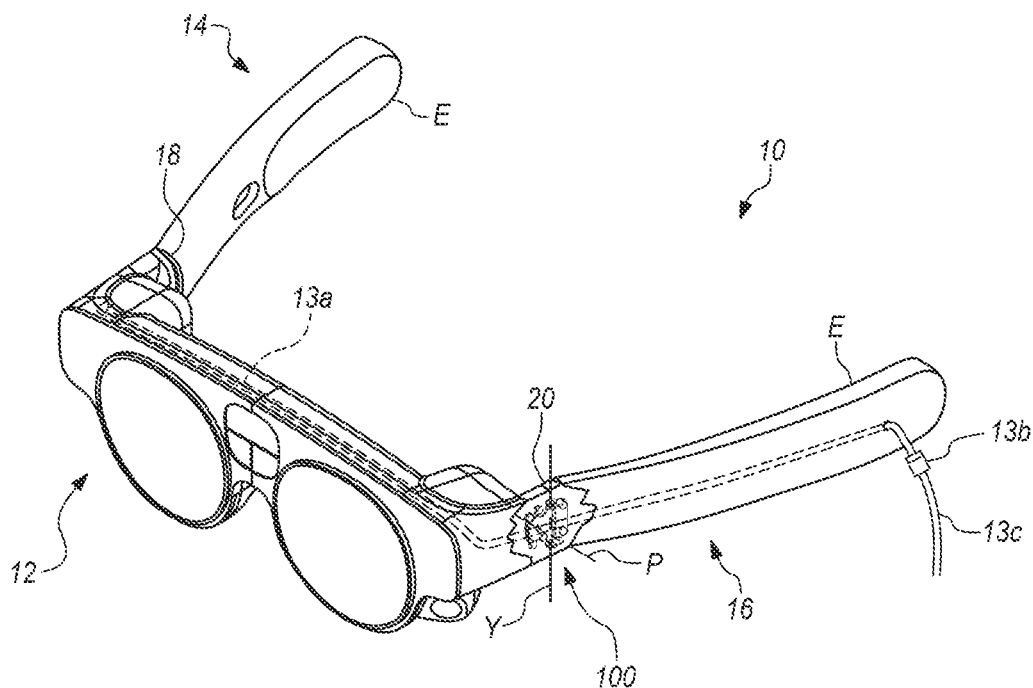
FIG. 2 is an isometric view of the spatial computing headset of FIG. 1 with the temple arms of the headset shown in an outwardly splayed or extended configuration.

FIGS. 1 through 9 show an example embodiment of a hinge system 100 that is particularly well adapted for eyewear. For example, and with reference to FIGS. 1 and 2, the hinge system 100 is particularly well adapted for a spatial computing headset 10. The spatial computing headset 10 includes an optics assembly 12 supported by a pair of temple arms 14, 16, which are connected together by a pair of hinge systems 100. Well-known structures and devices associated with spatial computing headsets (e.g., optical components and internal electronic circuitry) are not shown or described in detail to avoid unnecessarily obscuring descriptions of the embodiments disclosed herein. The example eyewear shown in FIGS. 1 and 2 is non-limiting, and embodiments may be employed in other suitable eyewear, other wearable devices, or other apparatuses employing hinged connections.

Notably, the temple arms 14, 16 of the example spatial computing headset 10 are movably coupled to the optics assembly 12 at joints 18, 20. Each joint 18, 20 includes a respective hinge system 100 that enables the temple arms 14, 16 to move relative to the optics assembly 12 in a plurality of directions about multiple degrees of freedom. As will be described in more detail below, the example spatial computing headset 10 includes hinge systems 100 at joints 18, 20 which enable the temple arms 14, 16 to spread outwardly (i.e., away from a sagittal plane of the user) about twenty degrees from the retracted configuration R shown in FIG. 1 to the expanded configuration E shown in FIG. 2. The hinge systems 100 further include at least one biasing member 109 (FIGS. 3 through 6) that urge the temple arms 14, 16 with a torsional force or torque back toward the retracted configuration R shown in FIG. 1. The hinge systems 100 of the example embodiment further enable each temple arm 14, 16 to pitch up and down about ten degrees from the neutral configuration shown in FIG. 1, such as in response to applied forces labeled $F_1$ and $F_2$. The hinge systems 100 further include at least one biasing member 108 (FIG. 3) that urges the temple arms 14, 16 back toward the neutral configuration shown in FIG. 1.

With continued reference to FIGS. 1 and 2, each hinge system 100, according to the example embodiment, is coupled to and spans between a forward end of a respective one of the temple arms 14, 16 and the optics assembly 12. As will be described in more detail elsewhere herein, the hinge systems 100 enable the temple arms 14, 16 to pitch up and down from a neutral configuration or position (e.g., a position where an temple arm exhibits no movement from its designed position due to external loading from, for example, manually manipulating the temple arm, fitting the spatial computing headset 10 on a user's head, etc.) about a pitch axis P, and to yaw outwardly from the retracted configuration R, as shown in FIG. 1, to the extended configuration E, as shown in FIG. 2. As such, the hinge systems 100 provide the temple arms 14, 16 with multiple degrees of freedom, namely, the ability to pitch up and down about the pitch axis P and to yaw sideways about the yaw axis Y.

Conveniently, in operation, a user may spread the temple arms 14, 16 of the spatial computing headset 10 to the extended configuration E shown in FIG. 2 under the constraints of the hinge systems 100. The user may then position the spatial computing headset 10 for use with the optics assembly 12 located in front of the user's eyes and with the temple arms 14, 16 extending past the user's temples, and then allow the temple arms 14, 16 to retract toward the retracted configuration R shown in FIG. 1 under a biasing force provided by the hinge systems 100 until the temple arms 14, 16 contact the user's head and apply a retention force thereto to assist in securing the spatial computing headset 10 in place. In this manner, the hinge systems 100 are configured to at least partially assist in biasing or torsioning the temple arms 14, 16 about their respective axes toward each other. In some instances, the hinge systems 100 may provide the sole means of biasing the temple arms 14, 16 toward each other.

Advantageously, the hinge systems 100 are also configured to resist over-extension and extreme deflection of the temple arms 14, 16 by providing substantial resistance and/or hard stops (e.g., hard stops as primary stops) to undesirable movement of the temple arms 14, 16. For example, the hinge systems 100 may reduce and/or counteract torsional loads that may otherwise be transferred to the optics assembly 12 via the joints 18, 20 when twisting one temple arm 14 up and one temple arm 16 down, as represented by the forces labeled $F_1$ and $F_2$ in FIG. 1. This may be advantageous in that the hinge systems 100 may therefore assist in preventing damage to vulnerable components of the optics assembly 12 that might otherwise result from such torsional loading.

Figure 3:
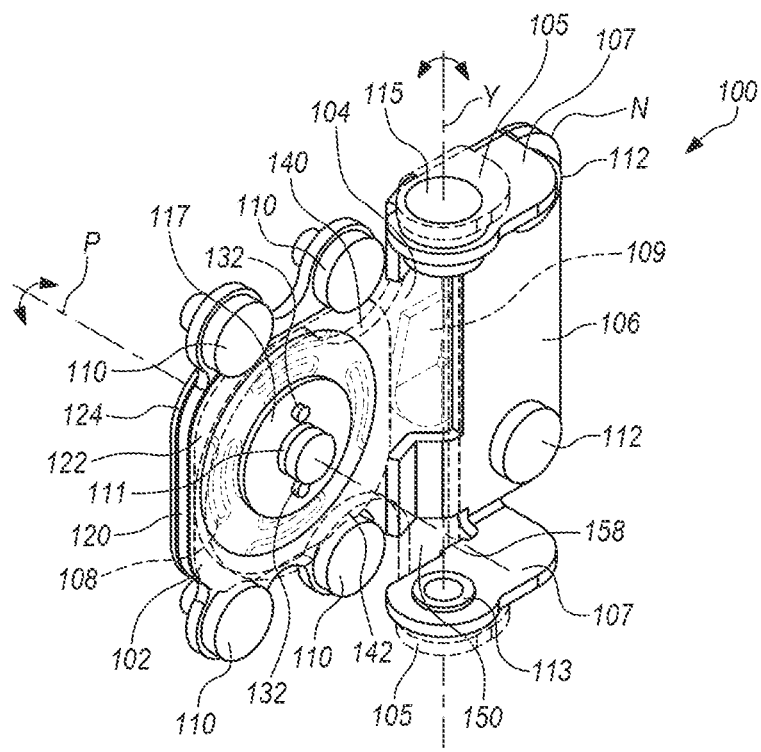
FIG. 3 is a front isometric view of one of the hinge systems shown isolated from the remainder of the spatial computing headset of FIGS. 1 and 2, with the hinge system shown in a neutral configuration. A portion of the hinge system is shown transparent to reveal underlying components.
Figure 4:
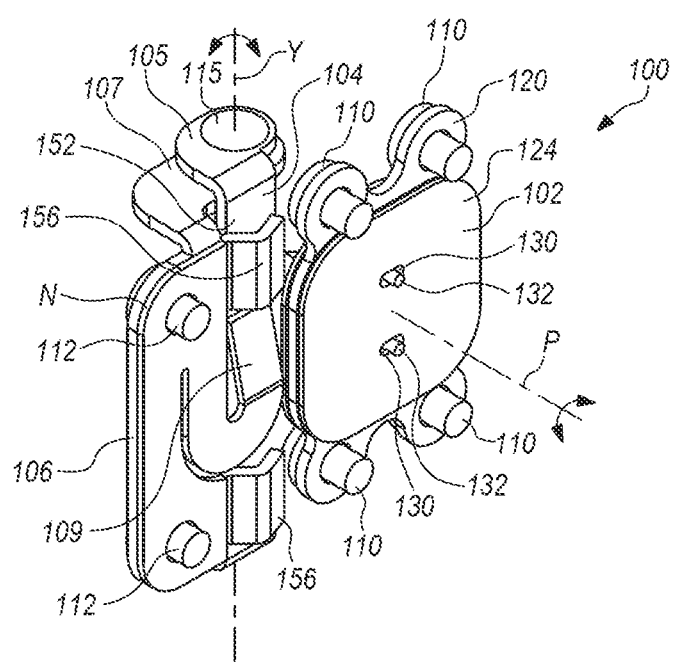
FIG. 4 is a rear isometric view of the hinge system in the neutral configuration.
Figure 5:
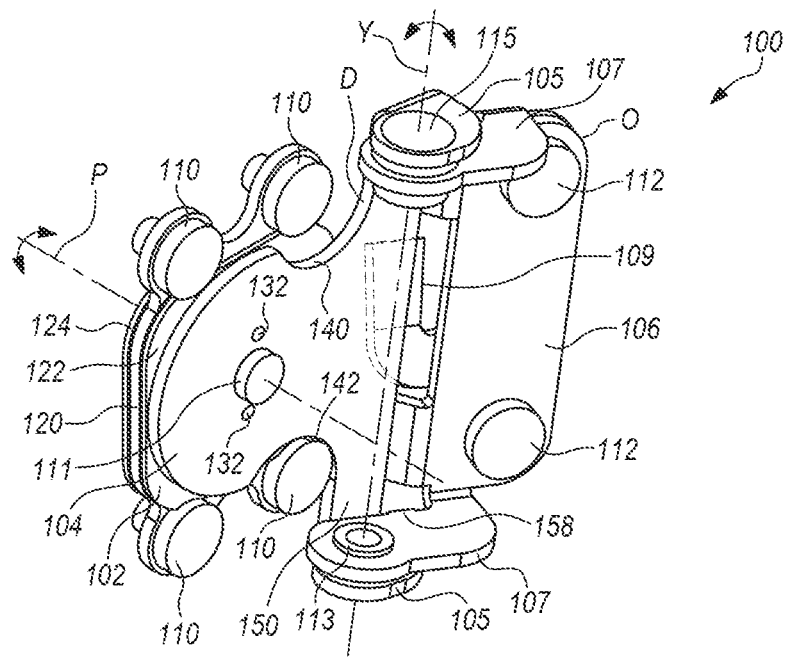
FIG. 5 is a front isometric view of the hinge system in an elastically deformed configuration.
Figure 6:
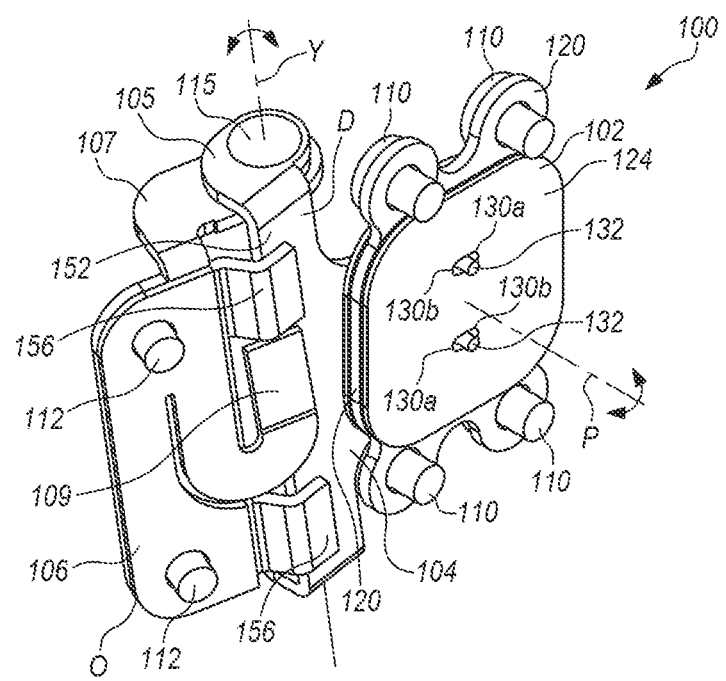
FIG. 6 is a rear isometric view of the hinge system in the same elastically deformed configuration of FIG. 5.
Figure 7A:
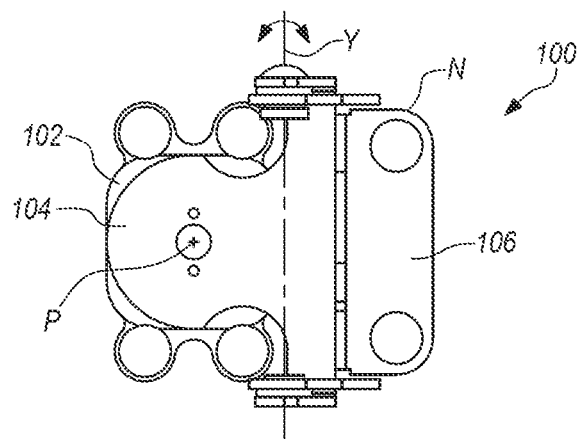
FIG. 7A is a front elevational view of the hinge system in the neutral configuration.
Figure 7B:
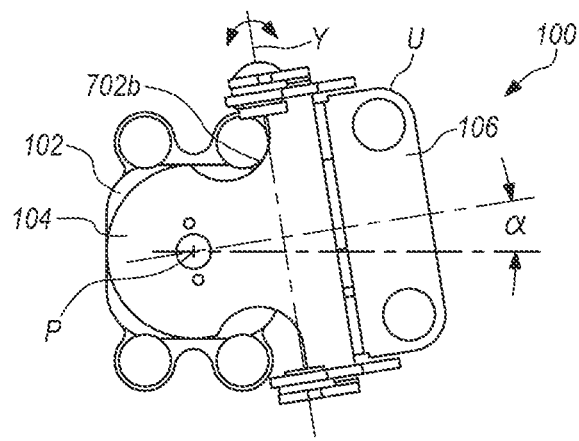
FIG. 7B is a front elevational view of the hinge system in a pitched up configuration.
Figure 7C:
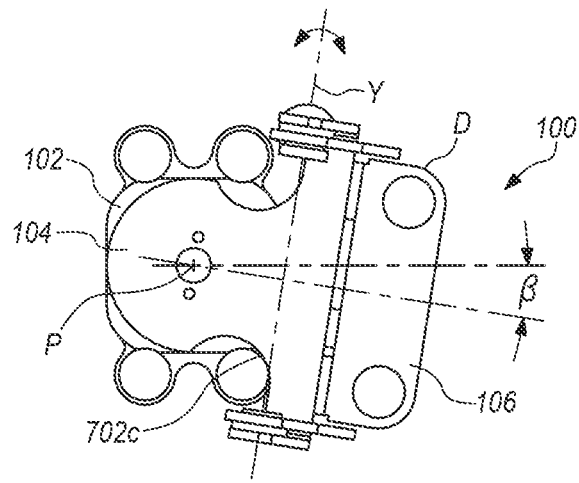
FIG. 7C is a front elevational view of the hinge system in a pitched down configuration.
Figure 8A:
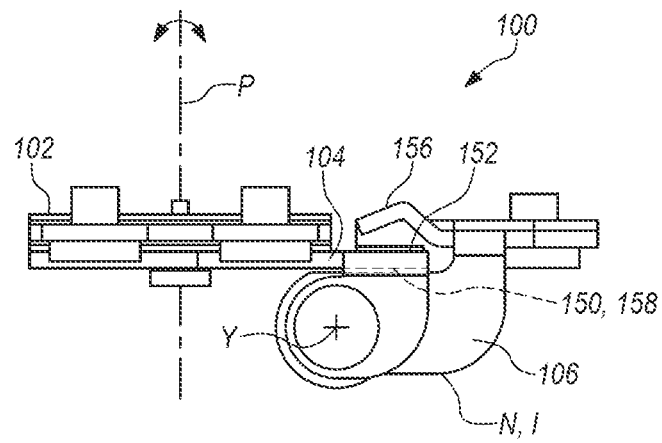
FIG. 8A is a top plan view of the hinge system in a neutral configuration.
Figure 8B:
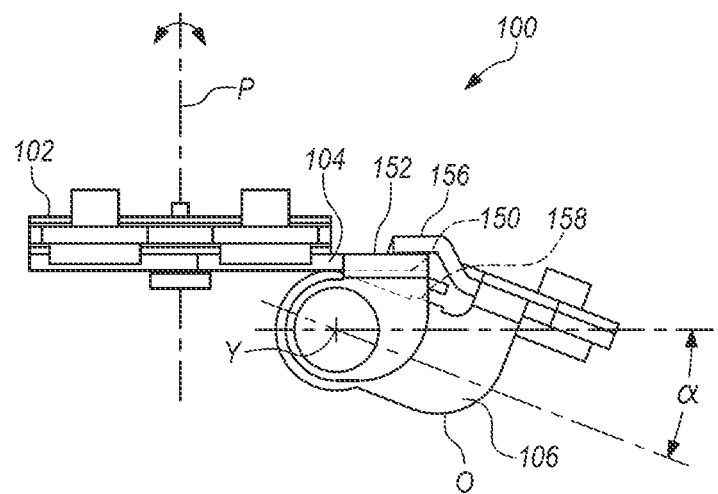
FIG. 8B is a top plan view of the hinge system in an outwardly splayed configuration.
Figure 9:
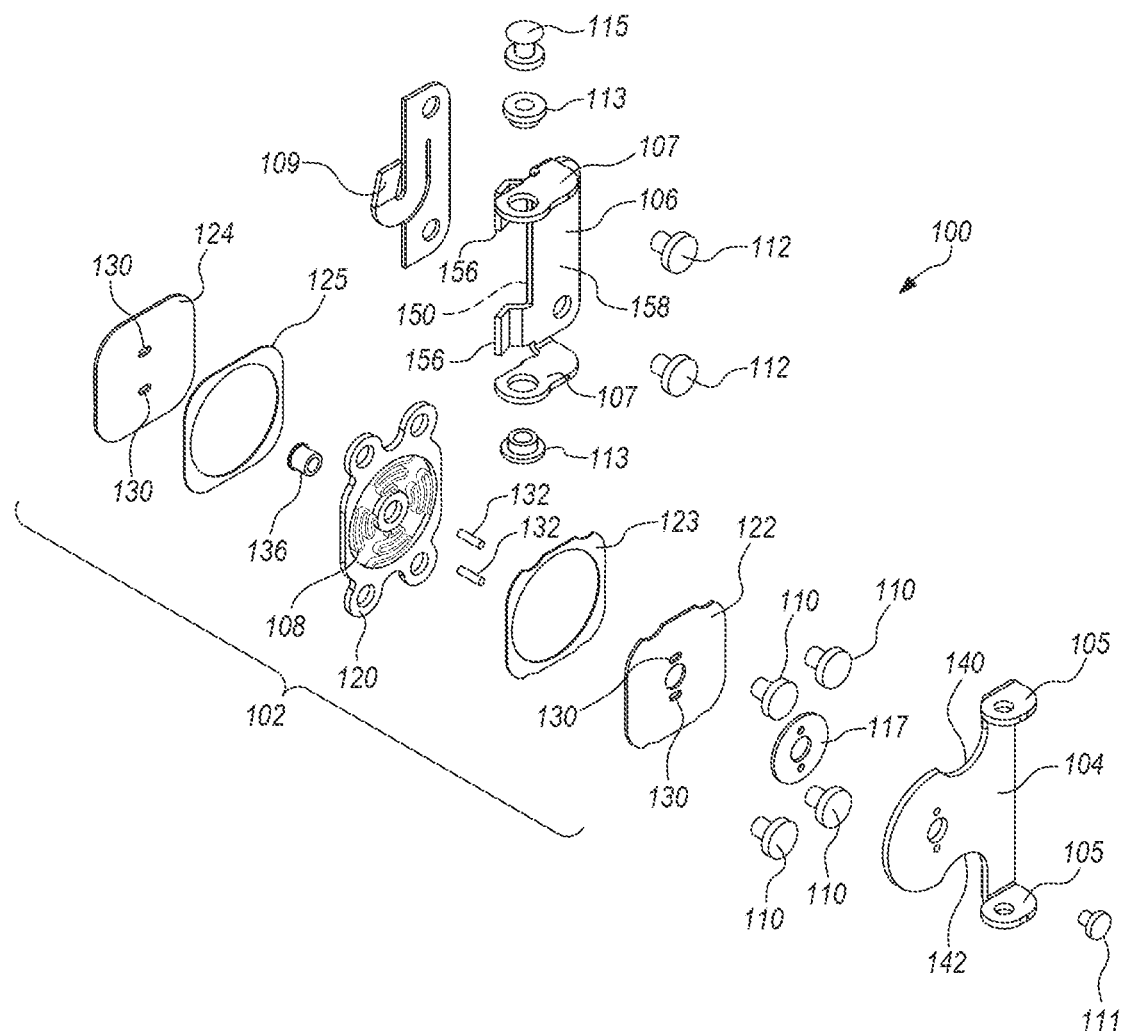
FIG. 9 is an exploded isometric view of the hinge system.

Further details of each hinge system 100 will now be described with reference to FIGS. 3 through 9, wherein: FIG. 3 shows the hinge system 100 in a neutral configuration or position N from a front isometric perspective; FIG. 4 shows the hinge system 100 in the neutral configuration N from a rear isometric perspective; FIG. 5 shows the hinge system 100 in an elastically deformed configuration from a front isometric perspective; FIG. 6 shows the hinge system 100 in the same elastically deformed configuration from a rear isometric perspective; FIG. 7A shows a front elevational view of the hinge system 100 in the neutral configuration N; FIG. 7B shows a front elevational view of the hinge system 100 in a pitched up configuration U; FIG. 7C shows a front elevational view of the hinge system 100 in a pitched down configuration D; FIG. 8A shows a top plan view of the hinge system 100 in the neutral configuration N; FIG. 8B shows a top plan view of the hinge system 100 in an outwardly splayed configuration O; and FIG. 9 shows an exploded isometric view of the hinge system 100.

With reference to FIGS. 3 through 6, the example embodiment of the hinge system 100 includes a hinge base 102 that is fixedly couplable to a first member, such as, for example, an optics assembly 12 of a spatial computing headset 10. The hinge base 102 may be fixedly coupled to the first member, for example, by one or more fasteners (e.g., screws, rivets). For example, the illustrated hinge system 100 includes an arrangement of four threaded screws 110 for this purpose.

The example embodiment of the hinge system 100 further includes: an intermediate hinge member 104 rotatably coupled to the hinge base 102 to rotate about a pitch axis P that extends through the hinge base 102; and a distal hinge member 106 that is rotatably coupled to the intermediate hinge member 104 to rotate about a yaw axis Y. The distal hinge member 106 is in turn fixedly couplable to a second member, such as, for example, a temple arm 14, 16 of a spatial computing headset 10. In some embodiments, a temple arm corresponds to a length direction along which the temple arm generally lies although it shall be noted that the temple arm may have a straight, linear profile along the length direction in some embodiments or one or more curved sections, rather than a straight, linear profile, in some other embodiments. In some embodiments, a temple arm (14 or 16) is fixedly attached to the to a distal hinge member 106 which is in turn rotatably coupled to an intermediate hinge member 104 so that the temple arm (14 or 16) may not only collapse about the yaw axis Y towards the center of the spatial computing headset 10 (e.g., for storage) but also yaw about the yaw axis Y and to pitch about the pitch axis P, where the yaw axis Y is substantially orthogonal (e.g., the length direction and the yaw axis Y are designed to be orthogonal to each other and are manufactured to deviate from the orthogonal relative positioning due to manufacturing tolerances) to the length direction of the temple arm, and the pitch axis P is substantially orthogonal to the yaw axis Y (e.g., the length direction and the yaw axis Y are designed to be orthogonal to each other and are manufactured to deviate from the orthogonal relative positioning due to manufacturing tolerances). The distal hinge member 106 may be fixedly coupled to the second member, for example, by one or more fasteners (e.g., screws, rivets). For example, the illustrated hinge system 100 includes an arrangement of two threaded screws 112 for this purpose. When installed for use, the example embodiment of the hinge system 100 provides a hinged connection that enables the second member to pitch and yaw relative to the first member. The pitch axis P and the yaw axis Y may be orthogonal to each other, as shown, for example, in the illustrated embodiment. In other instances, the pitch axis P and the yaw axis Y may be non-orthogonal. In any event, it is appreciated that the hinge system includes at least two rotational degrees of freedom, namely, rotation about the pitch axis P and rotation about the yaw axis Y.

As shown in FIG. 3, the hinge base 102 includes a biasing member 108 that is configured to rotationally bias the intermediate hinge member 104 about the pitch axis P toward a neutral configuration N (e.g., a position where the biasing member is in a free state exerting no torque or load) when the intermediate hinge member 104 is displaced from said neutral configuration N. As shown in the example embodiment of FIG. 3, the hinge base 102 may comprise a generally planar structure with an internal cavity that accommodates the biasing member 108. For instance, the hinge base 102 may comprise a generally planar base element 120 with the biasing member 108 being integrally formed therein. Furthermore, opposing covers 122, 124 may be fixedly secured to the generally planar base element 120, such as by adhesive layers 123, 125 (FIG. 9), to substantially conceal the biasing member 108 within an internal cavity of the hinge base 102. As shown in FIG. 3, the biasing member 108 may include a plurality of meandering spring elements that provide a rotational restoring force when a central hub of the biasing member 108 is rotated about the pitch axis P. The specific configuration of the biasing member 108 is non-limiting and illustrates one example configuration that is well adapted for providing a rotational restoring force in a relatively slender or thin form factor.

The opposing covers 122, 124 of the hinge base 102 may each include arcuate guides 130 (e.g., arcuate slots) to assist in guiding the intermediate hinge member 104 as the intermediate hinge member 104 rotates relative to the hinge base 102 about the pitch axis P. More particularly, one or more guide pins 132 may extend between the intermediate hinge member 104 and the biasing member 108 of the hinge base 102 and ride in the arcuate guides 130 as the intermediate hinge member 104 pitches up and down about the pitch axis P. Clearance may be provided between a profile of the arcuate guides 130 and the corresponding guide pins 132 to enable some translational displacement of the intermediate hinge member 104 relative to the hinge base 102. In this manner, the intermediate hinge member 104 may float on the biasing member 108 with some play in all translational directions normal to the pivot axis P in addition to the aforementioned rotational degrees of freedom, thereby providing a particularly versatile hinge structure.

The hinge base 102 may further include a bushing 136 that is aligned with the pitch axis P, and the intermediate hinge member 104 may be pivotably mounted about the bushing 136 to pitch up and down about the pitch axis P. In some instances, clearance (e.g., a gap) may be provided between the bushing 136 and the intermediate hinge member 104 to enable some translational displacement of the intermediate hinge member 104 relative to the hinge base 102. In this manner, the hinge system 100 may provide some play in all translational directions normal to the pivot axis P in addition to the aforementioned rotational degrees of freedom, thereby providing a particularly versatile hinge structure. The intermediate hinge member 104 may be coupled to the hinge base 102 by a suitable fastener, such as, for example, a threaded screw 111, which threadingly engages the bushing 136. A spacer 117 may be provided between the intermediate hinge member 104 and the hinge base 102 to facilitate rotation of the intermediate hinge member 104 relative to the hinge base 102.

The hinge base 102 and the intermediate hinge member 104 preferably include one or more stop arrangements or mechanisms to limit rotational travel of the intermediate hinge member 104 relative to the hinge base 102 about the pitch axis P. The one or more stop arrangements may comprise, for example, a first rotational stop 130a (FIG. 6) provided on the hinge base 102 that is configured to impede a path of the intermediate hinge member 104 when the intermediate hinge member 104 pitches up to an upward limit U (shown in FIG. 7B) and a second rotational stop 130b (FIG. 6) provided on the hinge base 102 that is configured to impede the path of the intermediate hinge member 104 when the intermediate hinge member 104 pitches down to a downward limit D (shown in FIG. 7C). The first and second rotational stops 130a, 130b may be provided, for example, by portions of the aforementioned arcuate guides 130 (e.g., arcuate slots) provided in the hinge base 102 that impede a path of the intermediate hinge member 104 (via guide pins 132 which extend between the intermediate hinge member 104 and the arcuate guides 130) when the intermediate hinge member 104 pitches up and down to the upward limit U and the downward limit D, respectively.

In some instances, one or more stop arrangements may comprise a first rotational stop provided on the intermediate hinge member 104 that is configured to abut the hinge base 102 when the intermediate hinge member 104 pitches up to an upward limit U (show in FIG. 7B) and a second rotational stop provided on the intermediate hinge member 104 that is configured to abut the hinge base 102 when the intermediate hinge member 104 pitches down to a downward limit D (shown in FIG. 7C). The first and second rotational stops may be provided, for example, by peripheral edges 140, 142 of the intermediate hinge member 104, which may abut a respective fastener 110, or other component part of the hinge base 102, when the intermediate hinge member 104 pitches up and down to the upward limit U and the downward limit D, respectively. Such rotational stops serve as backup stops in the event of failure of primary rotational stops provided by the base hinge 102.

With reference to FIGS. 7A-7C, the hinge system 100 of the example embodiment is configured to enable the intermediate hinge member 104 to pitch up and down from a neutral configuration N in an upward range α and a downward range β at least about five degrees in each rotational direction about the pitch axis P, and more particularly at least about ten degrees. FIG. 7A shows the intermediate hinge member 104 in the neutral configuration N wherein the intermediate hinge member 104 is aligned substantially horizontal; FIG. 7B shows the intermediate hinge member 104 pitched up to the upward limit U at about positive ten degrees from horizontal; and FIG. 7C shows the intermediate hinge member 104 pitched down to the downward limit D at about negative ten degrees from horizontal. Although the hinge system 100 of the example embodiment is shown with an upward range α and a downward range β that are about equal, it is appreciated that the hinge system 100 may be configured to pitch in one direction more than the other. In addition, although the range of the example embodiment is approximately ten degrees in each rotational direction about the pitch axis P, it is appreciated that the hinge system 100 may be configured to have a greater range of motion, or a lesser range of motion. It is also appreciated, that the neutral configuration N may be defined by the intermediate hinge member 104 being at an angular orientation other than horizontal.

As previously indicated, the example embodiment of the hinge system 100 includes a distal hinge member 106 that is rotatably coupled to the intermediate hinge member 104 to rotate about a yaw axis Y. For this purpose, each of the intermediate hinge member 104 and the distal hinge member 106 include respective features for forming a rotational joint. Such features may include, for example, respective flanges 105, 107 that mate together to form a rotational joint and define the yaw axis Y extending therethrough. The joint or joints may be provided with bushings 113 and may be held together by one or more suitable fasteners, such as rivets 115 (only one shown).

With reference again to FIGS. 3 through 6, a biasing member 109 is provided between the distal hinge member 106 and the intermediate hinge member 104 to bias the distal hinge member 104 toward a neutral configuration N, as shown in FIGS. 3 and 4, when the distal hinge member 106 is rotated from the neutral configuration N about the yaw axis Y, as shown in FIGS. 5 and 6. As may be appreciated from FIGS. 5 and 6, the biasing member 109 is provided in the form of a cantilevered spring arm and is elastically deformed when the distal hinge member 106 is rotated about the yaw axis Y to urge the distal hinge member 106 back toward the neutral configuration N shown in FIGS. 3 and 4.

The intermediate hinge member 104 and the distal hinge member 106 of the hinge system 100 preferably include one or more stop arrangements to limit rotational travel of the distal hinge member 106 relative to the intermediate hinge member 104 about the yaw axis Y. The one or more stop arrangements may comprise, for example, a first rotational stop provided on the intermediate hinge member that is configured to impede a path of the distal hinge member 106 when the distal hinge member 106 yaws to an outward limit O (shown in FIG. 8B) and a second rotational stop provided on the intermediate hinge member 104 that is configured to impede the path of the distal hinge member 106 when the distal hinge member yaws to an inward limit I (shown in FIG. 8A), which according to the example embodiment is also the neutral configuration N. The first and second rotational stops may be provided, for example, by opposing portions 150, 152 of a plate structure of the intermediate hinge member 104 that impede the path of the distal hinge member 106 when the distal hinge member 106 yaws to the outward limit O and the inward limit I, respectively.

In some instances, one or more stop arrangements may comprise a first rotational stop provided on the distal hinge member 106 that is configured to abut the intermediate hinge member 104 when the distal hinge member yaws to the outward limit O (shown in FIG. 8B) and a second rotational stop provided on the distal hinge member 106 that is configured to abut the intermediate hinge member 104 when the distal hinge member 106 yaws to an inward limit I (shown in FIG. 8A). The first and second rotational stops may be provided, for example, by distinct portions 156, 158 of the distal hinge member 106 that are configured to abut opposing sides of the intermediate hinge member 104.

With reference to FIGS. 8A and 8B, the hinge system 100 of the example embodiment is configured to enable the distal hinge member (and any component connected thereto, such as a temple arm 14, 16) to yaw at least fifteen degrees about the yaw axis Y, and more particularly at least twenty degrees. FIG. 8A shows the distal hinge member 106 in a neutral configuration N wherein the distal hinge member 106 is aligned substantially parallel to the base hinge 102 and to the intermediate hinge member 104; and FIG. 8B shows the distal hinge member 106 rotated outward about the yaw axis Y to the outward limit O at about twenty degrees from the neutral configuration N. Although the hinge system 100 of the example embodiment is shown with an outward range γ of about twenty degrees and no inward range, it is appreciated that the hinge system 100 may be configured to yaw to a greater or lesser extent in each rotational direction about the yaw axis Y. It is also appreciated, that the neutral configuration N may be defined by the distal hinge member 106 being at an angular orientation other than substantially parallel to the base hinge 102 and the intermediate hinge member 104.

As previously discussed, embodiments described herein provide multiple degree of freedom hinge systems 100 that are particularly well adapted to support the temple arms 14, 16 of eyewear devices, including spatial computing headsets 10. In the context of spatial computing headsets 10 having an optics assembly 12 supported by opposing temple arms 14, 16, the multiple degree of freedom hinge systems 100 may provide protection against over-extension of the temple arms 14, 16 or extreme deflections that may otherwise arise from undesirable torsional loading of the temple arms 14, 16 (e.g., twisting one temple arm up and one temple arm down). For example, the multiple degree of freedom hinge systems 100 may allow the temple arms 14, 16 of eyewear devices (e.g., spatial computing headsets 10) to rotate about at least two different axes of rotation, namely, a pitch axis P and a yaw axis Y, to decouple forces imposed to the temple arms 14, 16 from the structure of the eyewear device forward of the hinge division (e.g., the optics assembly 12).

In addition, embodiments of the hinge systems 100 are provided in relatively compact and efficient form factors. For example, in the context of spatial computing headsets 10 having an optics assembly 12 supported by opposing temple arms 14, 16, the multiple degree of freedom hinge systems 100 are sufficiently compact to be substantially concealed within the optics assembly 12 and temple arm members 14, 16 (as may be appreciated from FIGS. 1 and 2). Furthermore, the hinge systems 100 may be configured to maintain a flexible circuit passage 13a within a respective joint 18, 20 of the spatial computing headsets 10 from a leading end of the hinge system 100 to a trailing end of the hinge system 100 throughout manipulation of the hinge system 100.

The flexible circuit passage may comprise one or more interconnected voids between the hinge system 100 and a housing of the spatial computing headset 10, which runs along a length of the hinge system 100 from the leading end to the trailing end of the hinge system to allow one or more electrical wires, interconnects, etc. to pass through. This may be advantageous in allowing electrical pathways to cross the joints 18, 20 to enable the optics assembly 12 to communicate or otherwise operation in conjunction with electronics stored in the temple arms 14, 16. Some or all of the one or more voids may have sufficient volumes to provide sufficient relief to the one or more electrical wires, interconnects, etc. so that the manipulation (e.g., pitching and/or yawing) of a temple arm does not impose adverse effects (e.g., fatigue due to bending of the one or more electrical wires, interconnects, etc.) on the one or more electrical wires, interconnects, etc.

Figure 10:
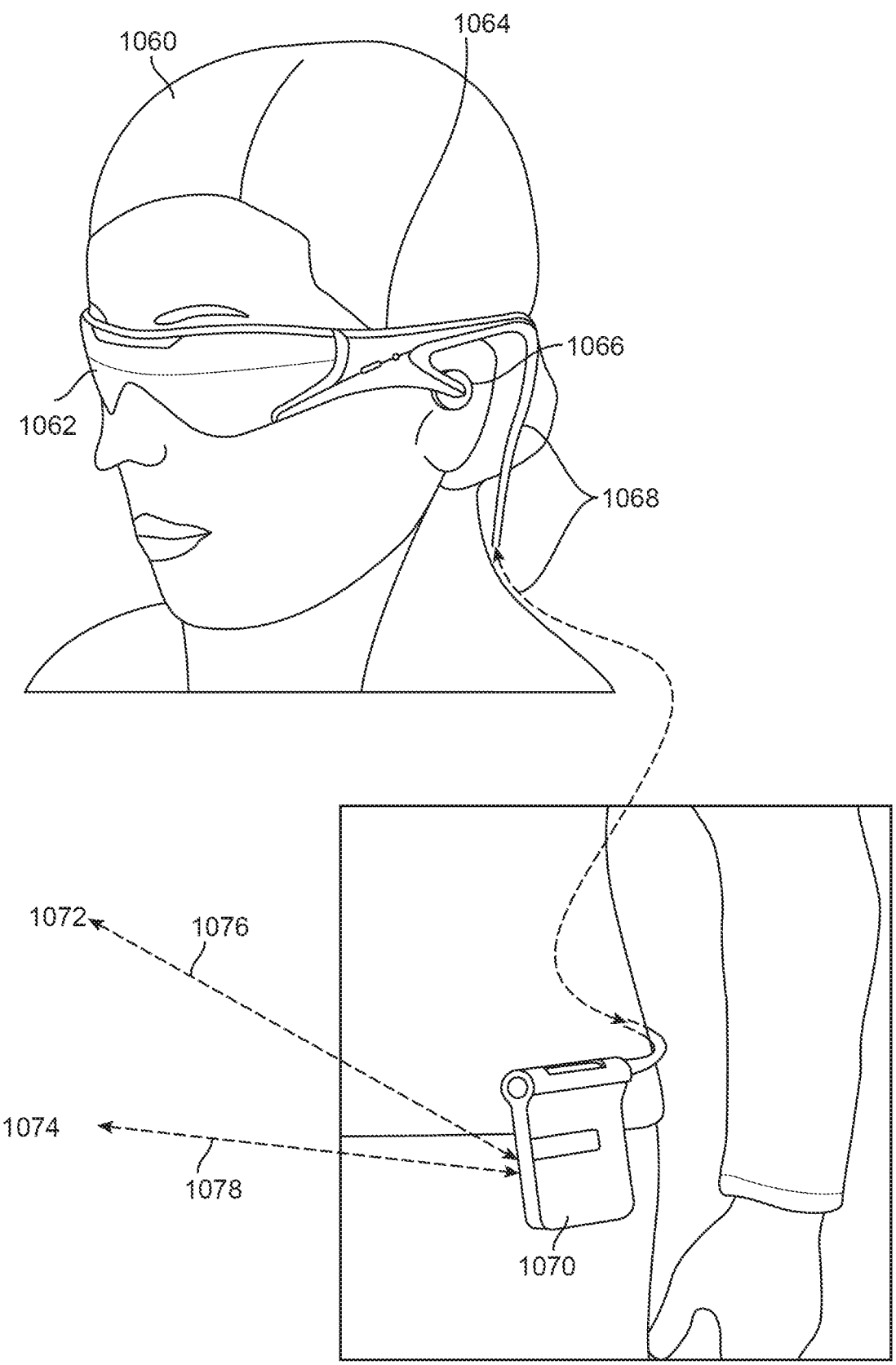
FIG. 10 illustrate one or more embodiments of various internal processing components of the wearable AR device.

In some embodiments, only one of the two opposing temple arms (14 or 16) is configured to accommodate a flexible circuit passage (13a). The flexible circuit passage (13a) may exit the temple arm (14 or 16) for connecting the optics assembly 12 with an external circuitry (e.g., circuitry in 1070 in FIG. 10, an external charging source such as a battery or a charging port, etc.) In some of these embodiments, the flexible circuit passage 13a may exit the temple arm with one or more electrical connectors 13b (only one shown in FIG. 2) that may receive one or more electrical connections (e.g., electrical connections via 1068 in FIG. 10). For example, the flexible electrical passage 13a may include an electrical connector 13b that receives an electrical cable 13c to connect the optics assembly 12 to an external belt pack (e.g., 1070 in FIG. 10) that may be removably attached to a user 1060 in a belt-coupling style configuration as shown in the embodiment of FIG. 10.

The local processing and data module 1070 may comprise a power-efficient processor or controller, as well as digital memory, such as flash memory, both of which may be utilized to assist in the processing, caching, and storage of data. The data may be captured from sensors which may be operatively coupled to the frame 1064, such as image capture devices (such as cameras), microphones, inertial measurement units, accelerometers, compasses, GPS units, radio devices, and/or gyros, or any other data capturing devices. In addition, or in the alternative, the data may be acquired and/or processed using the remote processing module 1072 and/or remote data repository 1074, possibly for passage to the display 1062 after such processing or retrieval.

The local processing and data module 1070 may be operatively coupled (1076 and/or 1078), such as via a wired or wireless communication links, to the remote processing module 1072 and remote data repository 1074 such that these remote modules (1072 or 1074) are operatively coupled to each other and available as resources to the local processing and data module 1070. The processing module 1070 may control the optical systems and other systems of the optics system (12), and execute one or more computing tasks, including retrieving data from the memory or one or more databases (e.g., a cloud-based server) in order to provide virtual content to the user.

In one embodiment, the remote processing module 1072 may comprise one or more relatively powerful processors or controllers configured to analyze and process data and/or image information. In one embodiment, the remote data repository 1074 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

In some other embodiments, the flexible circuit passages 13a may include a cable relief that accommodates one or more electrical wires or interconnects inside the optics system (12) to exist the temple arm (14 or 16). In these embodiments, the one or more electrical wires or interconnects inside the optics system (12) may pass through the cable relief and provide one or more respective connectors that may be connected to, for example, the belt pack (1070 in FIG. 10), an external charging device for charging an internal rechargeable battery, if any, of the optics system 12.

Although embodiments disclosed herein are predominately described in the context of a spatial computing headset 10 with hinge systems 100, it is appreciated that the hinge systems 100 or features and aspects of the hinges systems 100 may be incorporated in other eyewear, other wearable devices, or other apparatuses having hinged connections. However, it is also appreciated that embodiments of the hinge systems 100 disclosed herein are particularly well adapted for use with eyewear including temple arms to limit undesirable displacement or deformation of such temple arms.

In some embodiments where the optics system (12) provides VR, AR, MR, and/or ER contents to a user wearing the optics system, the optics system may include optical, electrical, and mechanical apparatuses to facilitate the representation of the VR, AR, MR, and/or ER contents to at least one eye of the user wearing the optics system (12). For example, an optics system (12) may include an array of micro-projectors with associated electronics and optical components to project virtual contents to at least one eye of the user or both eyes of the user while providing accommodation and/or convergence to the user. The accommodation is a reflex action of the eye, in response to focusing on a near target, then looking at a distance target (and vice versa), comprising coordinated changes in vergence, crystal lens shape and pupil size. Convergence is a vergence adduction movement that increase the visual angle to permit single binocular vision during near viewing. Convergence can be voluntary but need not be no near stimulus need be present to elicit vergence. It is also reflexive and a co-movement in the near response.

Figure 11A:
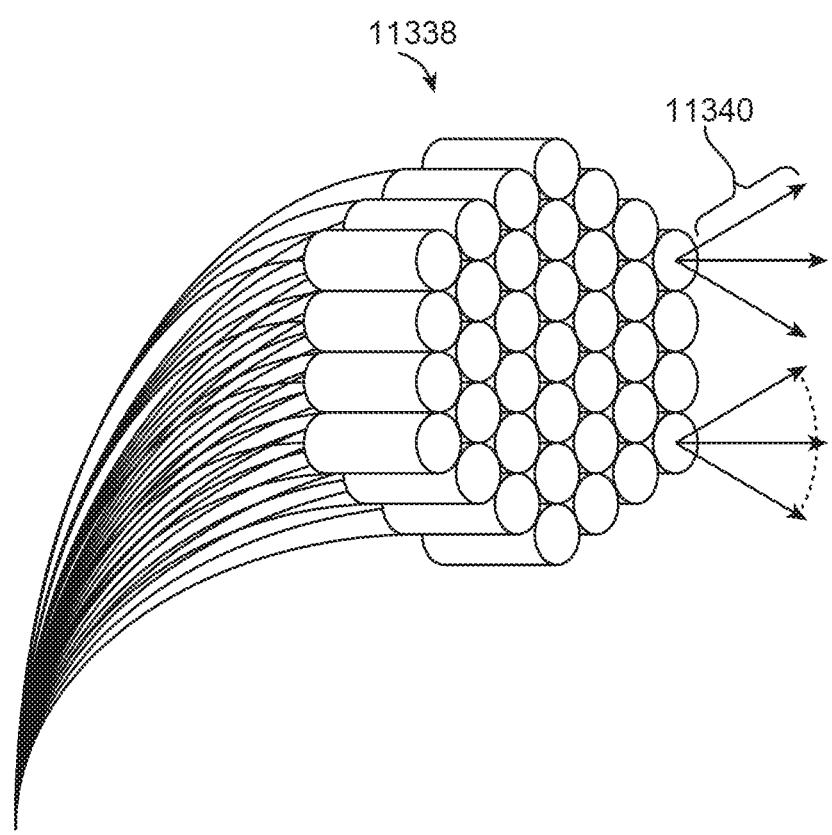
FIGS. 11A-I illustrate example configurations of an array of micro-projectors and coupling the array of micro-projectors with an optical system in one or more embodiments.
Figure 11B:
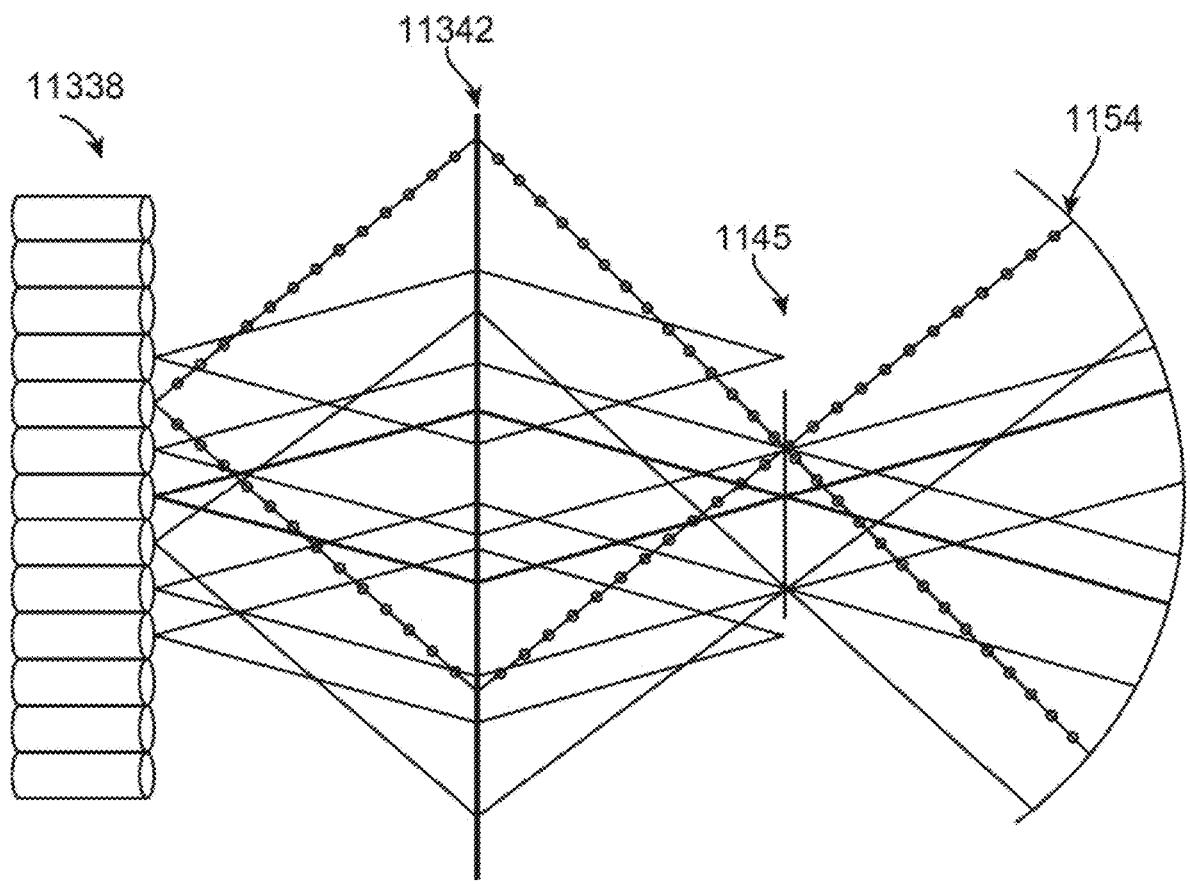
Figure 11C:
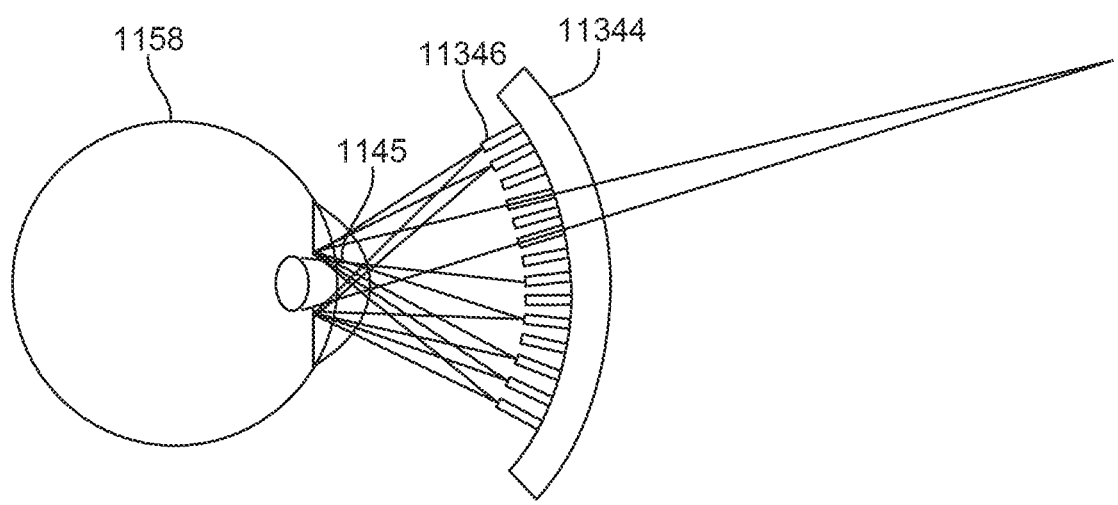
Figure 11D:
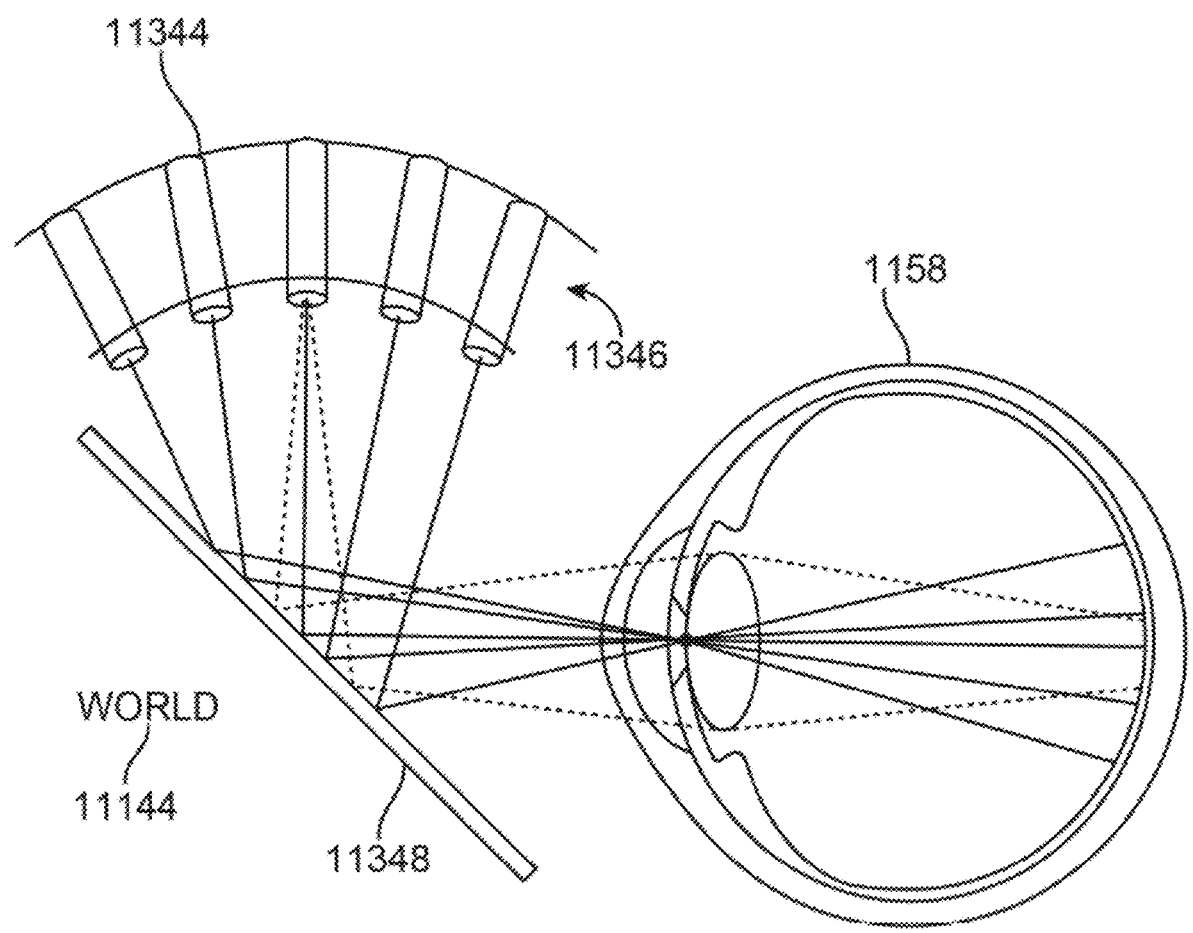
Figure 11F:
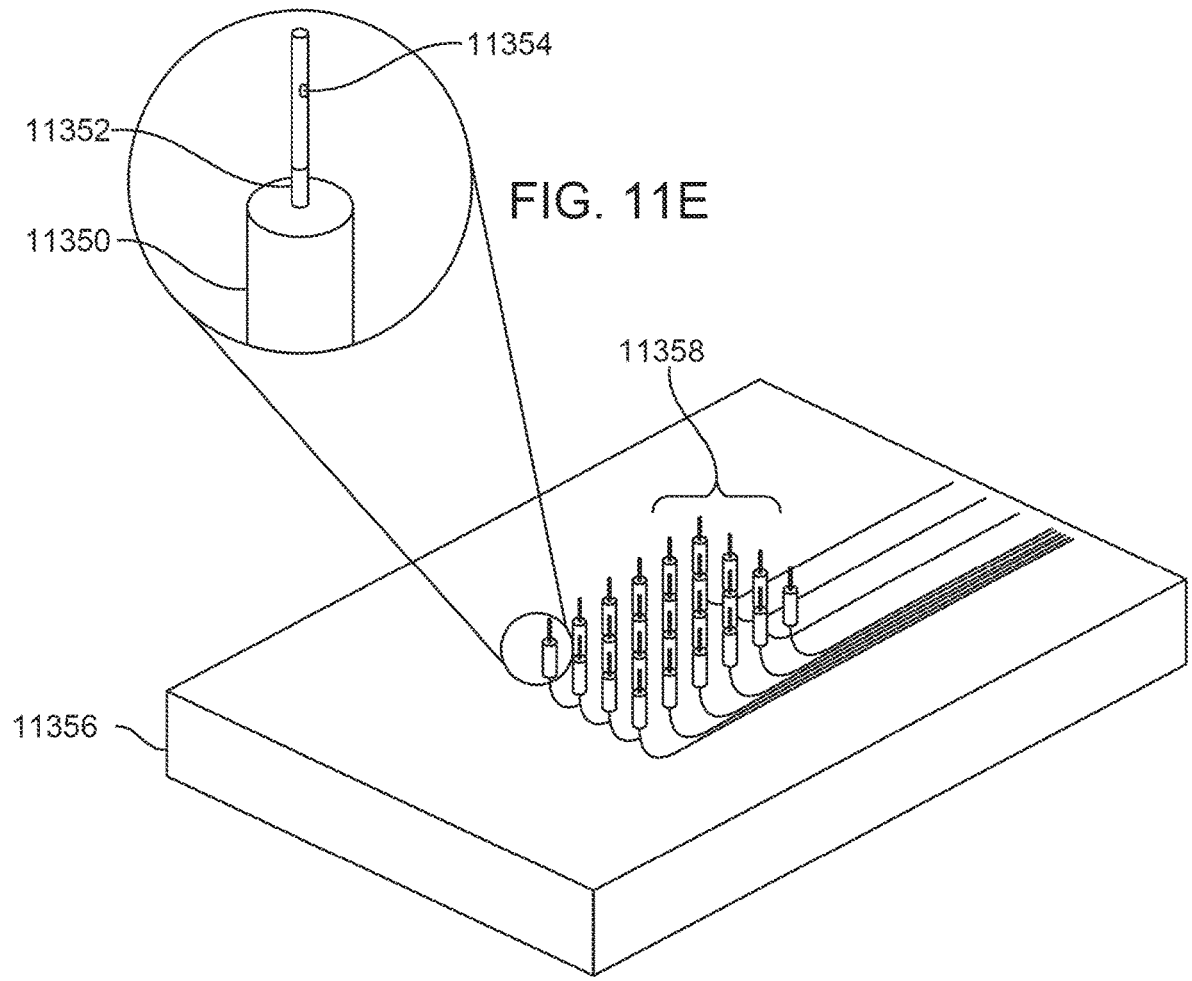
Figure 11G:
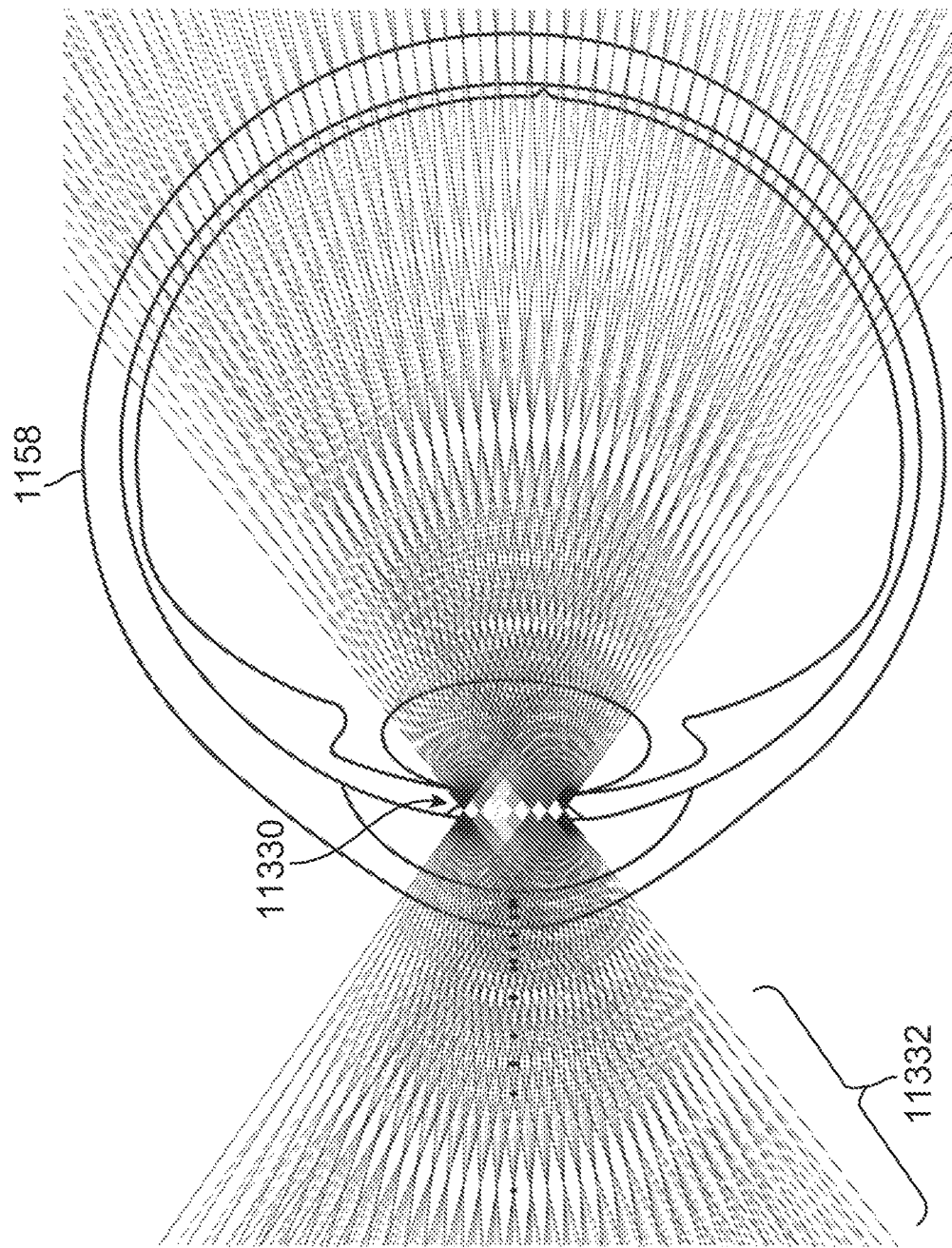
Figure 11H:
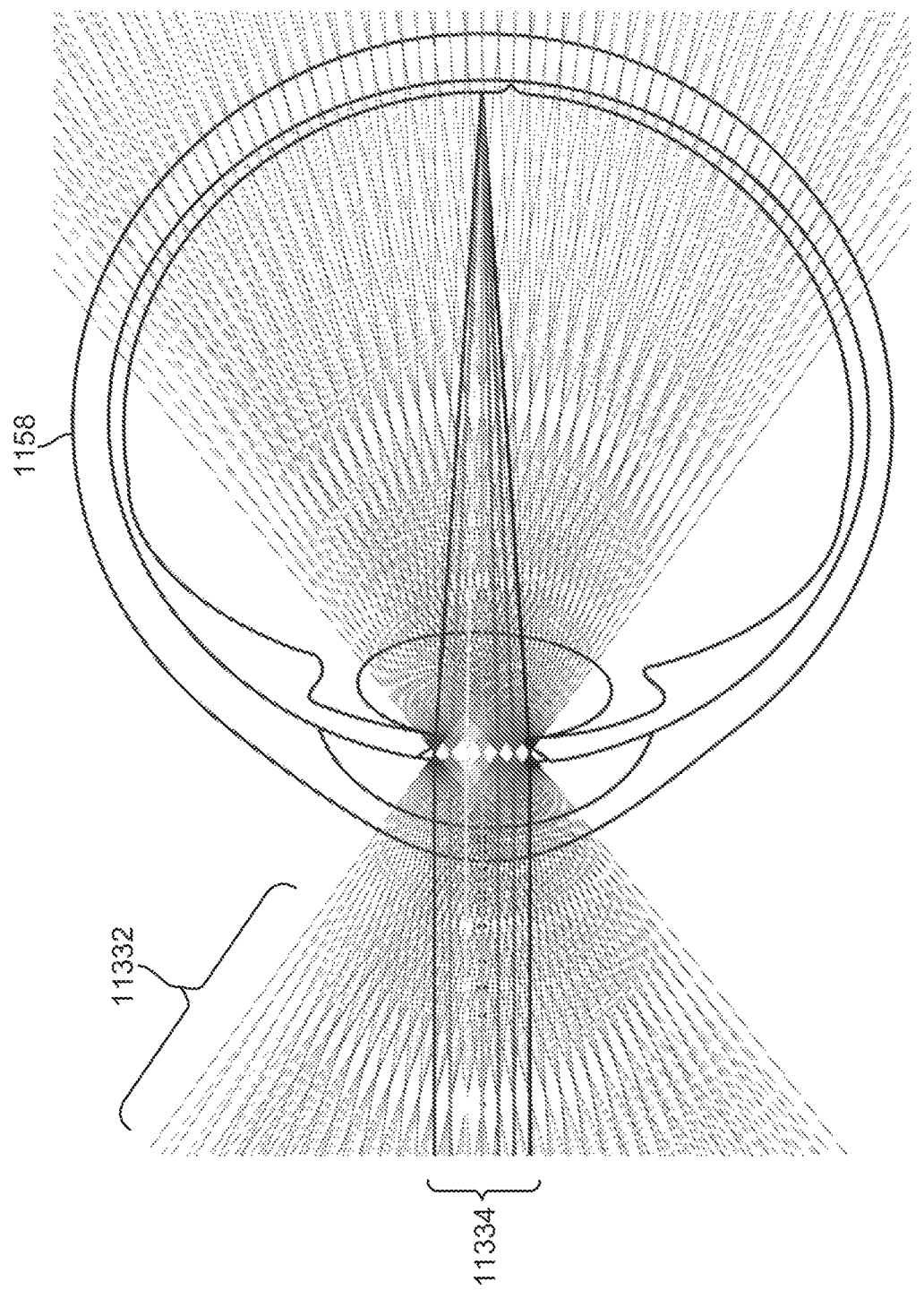
Figure 11:
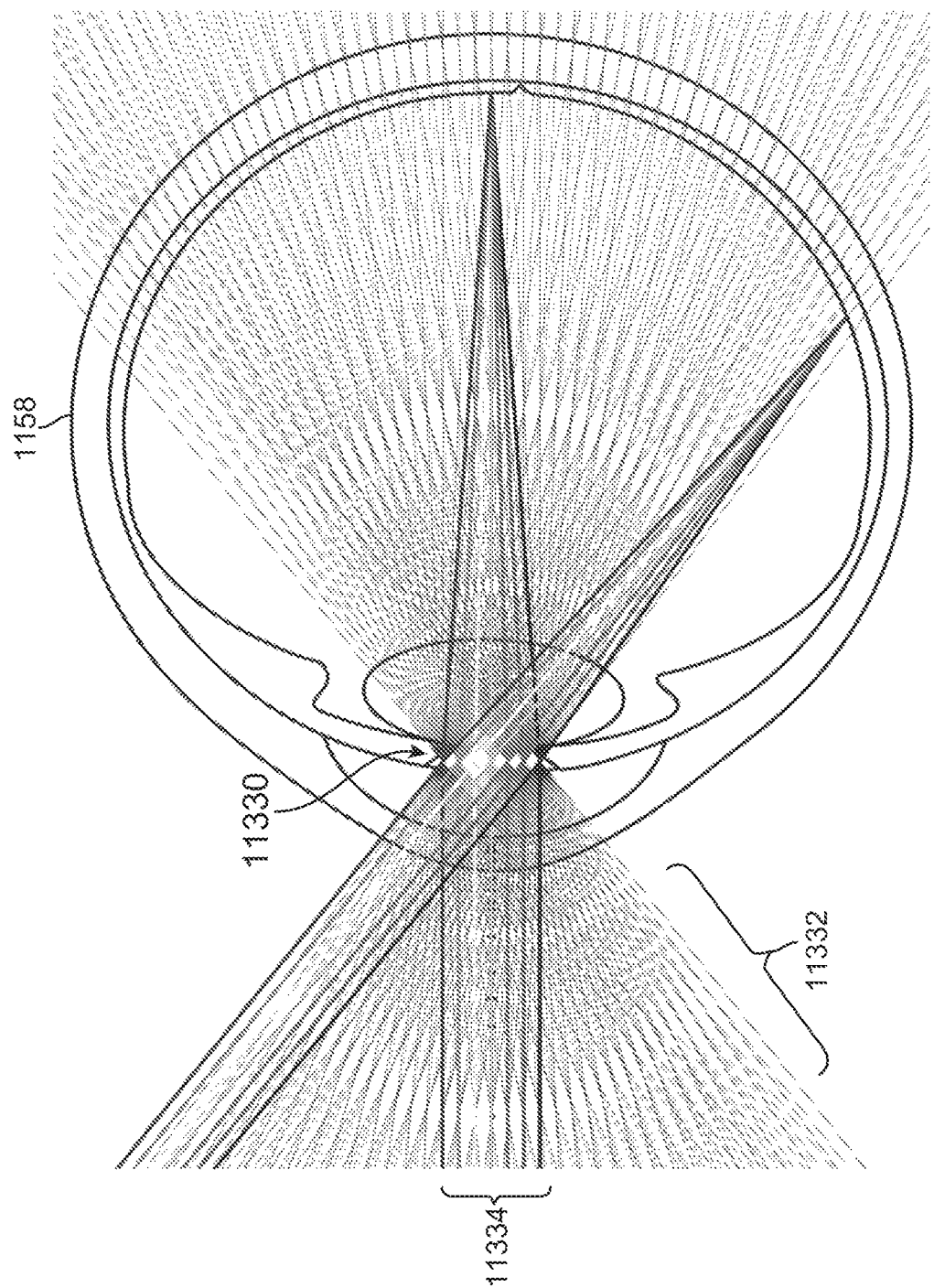

FIGS. 11A-I illustrate some non-limiting example configurations of an array of micro-projectors and schematics showing coupling the array of micro-projectors with an optical system in one or more embodiments. Referring to FIG. 11G, each of a multiplicity of incoming beamlets (11332) is passing through a small exit pupil (11330) relative to the eye 1158 in a discretized wavefront display configuration. Referring to FIG. 11H, a subset (11334) of the group of beamlets (11332) may be driven with matching color and intensity levels to be perceived as though they are part of the same larger-sized ray (the bolded subgroup (11334) may be deemed an "aggregated beam"). In this case, the subset of beamlets is parallel to one another, representing a collimated aggregate beam from optical infinity (such as light coming from a distant mountain). The eye is accommodated to infinity so the subset of beamlets is deflected by the eye's cornea and lens to all fall substantially upon the same location of the retina and are perceived to comprise a single in focus pixel.

FIG. 11*l* shows another subset of beamlets representing an aggregated collimated beam (11336) coming in from the right side of the field of view of the user's eye 58 if the eye 1158 is viewed in a coronal-style planar view from above. Again, the eye is shown accommodated to infinity, so the beamlets fall on the same spot of the retina, and the pixel is perceived to be in focus. If, in contrast, a different subset of beamlets were chosen that were reaching the eye as a diverging fan of rays, those beamlets would not fall on the same location of the retina (and be perceived as in focus) until the eye were to shift accommodation to a near point that matches the geometrical point of origin of that fan of rays.

With regards to patterns of points of intersection of beamlets with the anatomical pupil of the eye (e.g., the pattern of exit pupils), the points of intersection may be organized in configurations such as a cross-sectionally efficient hex-lattice or a square lattice or other two-dimensional array. Further, a three-dimensional array of exit pupils could be created, as well as time-varying arrays of exit pupils.

Discretized aggregate wavefronts may be created using several configurations, such as an array of microdisplays or microprojectors placed optically conjugate with the exit pupil of viewing optics, microdisplay or microprojector arrays coupled to a direct field of view substrate (such as an eyeglasses lens) such that they project light to the eye directly, without additional intermediate viewing optics, successive spatial light modulation array techniques, or waveguide techniques.

Referring to FIG. 11A, in one embodiment, a stereoscopic (e.g., three-dimensional) or a four- or five-dimensional lightfield may be created by bundling a group of small projectors or display units (such as scanned fiber displays). FIG. 11A depicts a hexagonal lattice projection bundle 11338 which may, for example, create a 7 mm-diameter hex array with each fiber display outputting a sub-image (11340). If such an array has an optical system, such as a lens, placed in front of it such that the array is placed optically conjugate with the eye's entrance pupil, this will create an image of the array at the eye's pupil, as shown in FIG. 11B, which essentially provides the same optical arrangement as the embodiment of FIG. 11G.

Each of the small exit pupils of the configuration is created by a dedicated small display in the bundle 11338, such as a scanning fiber display. Optically, it is as though the entire hex array 11338 is positioned right into the anatomical pupil 1145 in some embodiments. Such embodiments may be used for driving different sub-images to different small exit pupils within the larger anatomical entrance pupil 1145 of the eye, comprising a superset of beamlets with a multiplicity of incident angles and points of intersection with the eye pupil. Each of the separate projectors or displays may be driven with a slightly different image, such that sub-images may be created that pull out different sets of rays to be driven at different light intensities and colors.

In one embodiment, a strict image conjugate may be created, as in the embodiment of FIG. 11B, wherein there is direct one-to-one mapping of the array 11338 with the pupil 1145. In another variation, the spacing may be changed between displays in the array and the optical system (lens 11342 in FIG. 11B) such that instead of receiving a conjugate mapping of the array to the eye pupil, the eye pupil may be catching the rays from the array at some other distance. With such a configuration, one would still get an angular diversity of beams through which one could create a discretized aggregate wavefront representation, but the mathematics regarding how to drive which ray and at which power and intensity may become more complex (although, on the other hand, such a configuration may be considered simpler from a viewing optics perspective). The mathematics involved with light field image capture may be leveraged for these calculations.

Referring to FIG. 11C, another lightfield creating embodiment is depicted wherein an array of micro-displays or micro-projectors 11346 may be coupled to a frame (11344), such as an eyeglasses frame. This configuration may be positioned in front of the eye 1158. The depicted configuration is a nonconjugate arrangement wherein there are no large-scale optical elements interposed between the displays (for example, scanning fiber displays) of the array 11346 and the eye 1158. One can imagine a pair of glasses, and coupled to those glasses are a plurality of displays, such as scanning fiber engines, positioned orthogonal to the eyeglasses surface, and all angled inward so they are pointing at the pupil of the user. Each display may be configured to create a set of rays representing different elements of the beamlet superset.

With such a configuration, at the anatomical pupil 1145 the user may receive a similar result as received in the embodiments discussed in reference to FIG. 11G, in which every point at the user's pupil is receiving rays with a multiplicity of angles of incidence and points of intersection that are being contributed from the different displays. FIG. 11D illustrates a nonconjugate configuration similar to that of FIG. 11C, with the exception that the embodiment of FIG. 11D features a reflecting surface (11348) to facilitate moving the display array 11346 away from the eye's 58 field of view, while also allowing views of the real world 11144 through the reflective surface (11348).

Another configuration for creating the angular diversity for a discretized aggregate wavefront display is presented. To optimize such a configuration, the sizes of the displays may be decreased to the maximum. Scanning fiber displays which may be utilized as displays may have baseline diameters in the range of 1 mm, but reduction in enclosure and projection lens hardware may decrease the diameters of such displays to about 0.5 mm or less, which is less disturbing for a user. Another downsizing geometric refinement may be achieved by directly coupling a collimating lens (which may, for example, comprise a gradient refractive index, or "GRIN", lens, a conventional curved lens, or a diffractive lens) to the tip of the scanning fiber itself in a case of a fiber scanning display array. For example, referring to FIG. 11E, a GRIN (gradient-index) lens (11354) is shown fused to the end of a single mode optical fiber. An actuator 11350, such as a piezoelectric actuator, may be coupled to the fiber 11352 and may be used to scan the fiber tip.

In another embodiment the end of the fiber may be shaped into a hemispherical shape using a curved polishing treatment of an optical fiber to create a lensing effect. In another embodiment a standard refractive lens may be coupled to the end of each optical fiber using an adhesive. In another embodiment a lens may be built from a dab of transmissive polymeric material or glass, such as epoxy. In another embodiment the end of an optical fiber may be melted to create a curved surface for a lensing effect.

FIG. 11F shows an embodiment wherein display configurations (e.g., scanning fiber displays with GRIN lenses, shown in close-up view of FIG. 11E) may be coupled together through a single transparent substrate 11356 preferably having a refractive index that closely matches the cladding of the optical fibers 11352 such that the fibers themselves are not substantially visible for viewing of the outside world across the depicted assembly. It should be appreciated that if the index matching of the cladding is done precisely, then the larger cladding/housing becomes transparent and only the small cores, which preferably are about three (3) microns in diameter, will be obstructing the view. In one embodiment the matrix 11358 of displays may all be angled inward so they are directed toward the anatomic pupil of the user (in another embodiment, they may stay parallel to each other, but such a configuration is less efficient).

Figure 12:
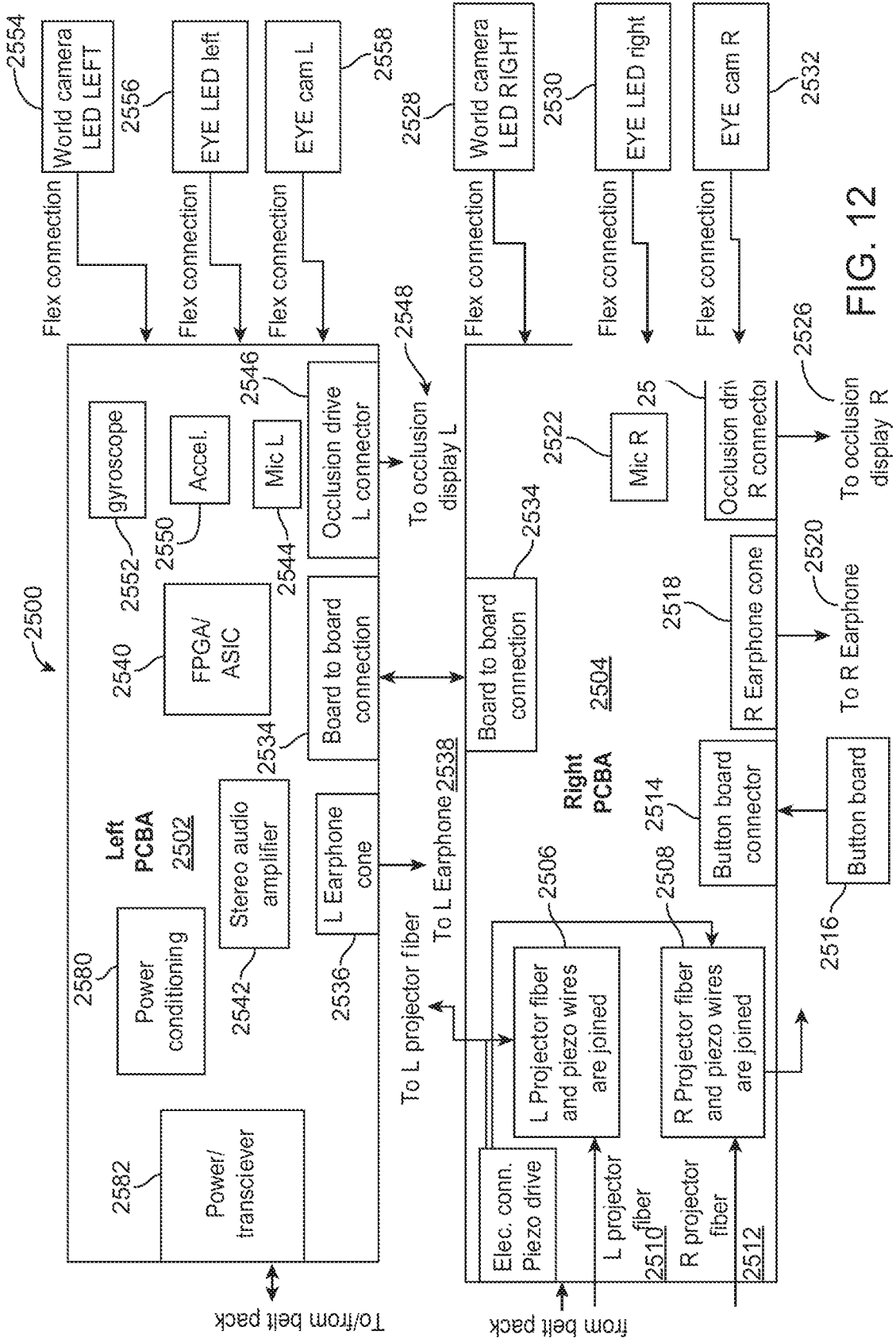
FIG. 12 shows an example architecture 2500 for the electronics operatively coupled to an optics system in one or more embodiments.

FIG. 12 shows an example architecture 2500 for the electronics operatively coupled to an optics system in one or more embodiments. The optics system (12) itself or an external device (e.g., a belt pack 1070 in FIG. 10) coupled to the optics system may include one or more printed circuit board components, for instance left (2502) and right (2504) printed circuit board assemblies (PCBA). As illustrated, the left PCBA 2502 includes most of the active electronics, while the right PCBA 604 supports principally supports the display or projector elements.

The right PCBA 2504 may include a number of projector driver structures which provide image information and control signals to image generation components. For example, the right PCBA 2504 may carry a first or left projector driver structure 2506 and a second or right projector driver structure 2508. The first or left projector driver structure 2506 joins a first or left projector fiber 2510 and a set of signal lines (e.g., piezo driver wires). The second or right projector driver structure 2508 joins a second or right projector fiber 2512 and a set of signal lines (e.g., piezo driver wires). The first or left projector driver structure 2506 is communicatively coupled to a first or left image projector, while the second or right projector drive structure 2508 is communicatively coupled to the second or right image projector.

In operation, the image projectors render virtual content to the left and right eyes (e.g., retina) of the user via respective optical components, for instance waveguides and/or compensation lenses to alter the light associated with the virtual images.

The image projectors may, for example, include left and right projector assemblies. The projector assemblies may use a variety of different image forming or production technologies, for example, fiber scan projectors, liquid crystal displays (LCD), LCOS displays, digital light processing (DLP) displays. Where a fiber scan projector is employed, images may be delivered along an optical fiber, to be projected therefrom via a tip of the optical fiber. The tip may be oriented to feed into the waveguide (FIGS. 23 and 24). The tip of the optical fiber may project images, which may be supported to flex or oscillate. A number of piezoelectric actuators may control an oscillation (e.g., frequency, amplitude) of the tip. The projector driver structures provide images to respective optical fiber and control signals to control the piezoelectric actuators, to project images to the user's eyes.

Continuing with the right PCBA 2504, a button board connector 2514 may provide communicative and physical coupling to a button board 2516 which carries various user accessible buttons, keys, switches or other input devices. The right PCBA 2504 may include a right earphone or speaker connector 2518, to communicatively couple audio signals to a right earphone 2520 or speaker of the head worn component. The right PCBA 2504 may also include a right microphone connector 2522 to communicatively couple audio signals from a microphone of the head worn component. The right PCBA 2504 may further include a right occlusion driver connector 2524 to communicatively couple occlusion information to a right occlusion display 2526 of the head worn component. The right PCBA 2504 may also include a board-to-board connector to provide communications with the left PCBA 2502 via a board-to-board connector 2534 thereof.

The right PCBA 2504 may be communicatively coupled to one or more right outward facing or world view cameras 2528 which are body or head worn, and optionally a right cameras visual indicator (e.g., LED) which illuminates to indicate to others when images are being captured. The right PCBA 2504 may be communicatively coupled to one or more right eye cameras 2532, carried by the head worn component, positioned and orientated to capture images of the right eye to allow tracking, detection, or monitoring of orientation and/or movement of the right eye. The right PCBA 2504 may optionally be communicatively coupled to one or more right eye illuminating sources 2530 (e.g., LEDs), which as explained herein, illuminates the right eye with a pattern (e.g., temporal, spatial) of illumination to facilitate tracking, detection or monitoring of orientation and/or movement of the right eye.

The left PCBA 2502 may include a control subsystem, which may include one or more controllers (e.g., microcontroller, microprocessor, digital signal processor, graphical processing unit, central processing unit, application specific integrated circuit (ASIC), field programmable gate array (FPGA) 2540, and/or programmable logic unit (PLU)). The control system may include one or more non-transitory computer- or processor readable medium that stores executable logic or instructions and/or data or information. The non-transitory computer- or processor readable medium may take a variety of forms, for example volatile and nonvolatile forms, for instance read only memory (ROM), random access memory (RAM, DRAM, SD-RAM), flash memory, etc. The non-transitory computer or processor readable medium may be formed as one or more registers, for example of a microprocessor, FPGA or ASIC.

The left PCBA 2502 may include a left earphone or speaker connector 2536, to communicatively couple audio signals to a left earphone or speaker 2538 of the head worn component. The left PCBA 2502 may include an audio signal amplifier (e.g., stereo amplifier) 2542, which is communicative coupled to the drive earphones or speakers. The left PCBA 2502 may also include a left microphone connector 2544 to communicatively couple audio signals from a microphone of the head worn component. The left PCBA 2502 may further include a left occlusion driver connector 2546 to communicatively couple occlusion information to a left occlusion display 2548 of the head worn component.

The left PCBA 2502 may also include one or more sensors or transducers which detect, measure, capture or otherwise sense information about an ambient environment and/or about the user. For example, an acceleration transducer 2550 (e.g., three axis accelerometer) may detect acceleration in three axes, thereby detecting movement. A gyroscopic sensor 2552 may detect orientation and/or magnetic or compass heading or orientation. Other sensors or transducers may be similarly employed.

The left PCBA 2502 may be communicatively coupled to one or more left outward facing or world view cameras 2554 which are body or head worn, and optionally a left cameras visual indicator (e.g., LED) 2556 which illuminates to indicate to others when images are being captured. The left PCBA may be communicatively coupled to one or more left eye cameras 2558, carried by the head worn component, positioned and orientated to capture images of the left eye to allow tracking, detection, or monitoring of orientation and/ or movement of the left eye. The left PCBA 2502 may optionally be communicatively coupled to one or more left eye illuminating sources (e.g., LEDs) 2556, which as explained herein, illuminates the left eye with a pattern (e.g., temporal, spatial) of illumination to facilitate tracking, detection or monitoring of orientation and/or movement of the left eye.

The PCBAs 2502 and 2504 are communicatively coupled with the distinct computation component (e.g., belt pack) via one or more ports, connectors and/or paths. For example, the left PCBA 2502 may include one or more communications ports or connectors to provide communications (e.g., bi-directional communications) with the belt pack. The one or more communications ports or connectors may also provide power from the belt pack to the left PCBA 2502. The left PCBA 2502 may include power conditioning circuitry 2580 (e.g., DC/DC power converter, input filter), electrically coupled to the communications port or connector and operable to condition (e.g., step up voltage, step down voltage, smooth current, reduce transients).

The communications port or connector may, for example, take the form of a data and power connector or transceiver 2582 (e.g., Thunderbolt® port, USB® port). The right PCBA 2504 may include a port or connector to receive power from the belt pack. The image generation elements may receive power from a portable power source (e.g., chemical battery cells, primary or secondary battery cells, ultra-capacitor cells, fuel cells), which may, for example be located in the belt pack.

As illustrated, the left PCBA 2502 includes most of the active electronics, while the right PCBA 2504 supports principally supports the display or projectors, and the associated piezo drive signals. Electrical and/or fiber optic connections are employed across a front, rear or top of the body or head worn component of the optics system (12). Both PCBAs 2502 and 2504 are communicatively (e.g., electrically, optically) coupled to the belt pack. The left PCBA 2502 includes the power subsystem and a high-speed communications subsystem. The right PCBA 2504 handles the fiber display piezo drive signals. In the illustrated embodiment, only the right PCBA 2504 needs to be optically connected to the belt pack. In other embodiments, both the right PCBA and the left PCBA may be connected to the belt pack.

While illustrated as employing two PCBAs 2502 and 2504, the electronics of the body or head worn component may employ other architectures. For example, some implementations may use a fewer or greater number of PCBAs. As another example, various components or subsystems may be arranged differently than illustrated in FIG. 12. For example, in some alternative embodiments some of the components illustrated in FIG. 12 as residing on one PCBA may be located on the other PCBA, without loss of generality.

As described above with reference to, for example, FIG. 11A, an optics system (12) described herein may present virtual contents to a user so that the virtual contents may perceived as three-dimensional contents in some embodiments. In some other embodiments, an optics system (12) may present virtual contents in a four- or five-dimensional lightfield (or light field) to a user.

Figure 13A:
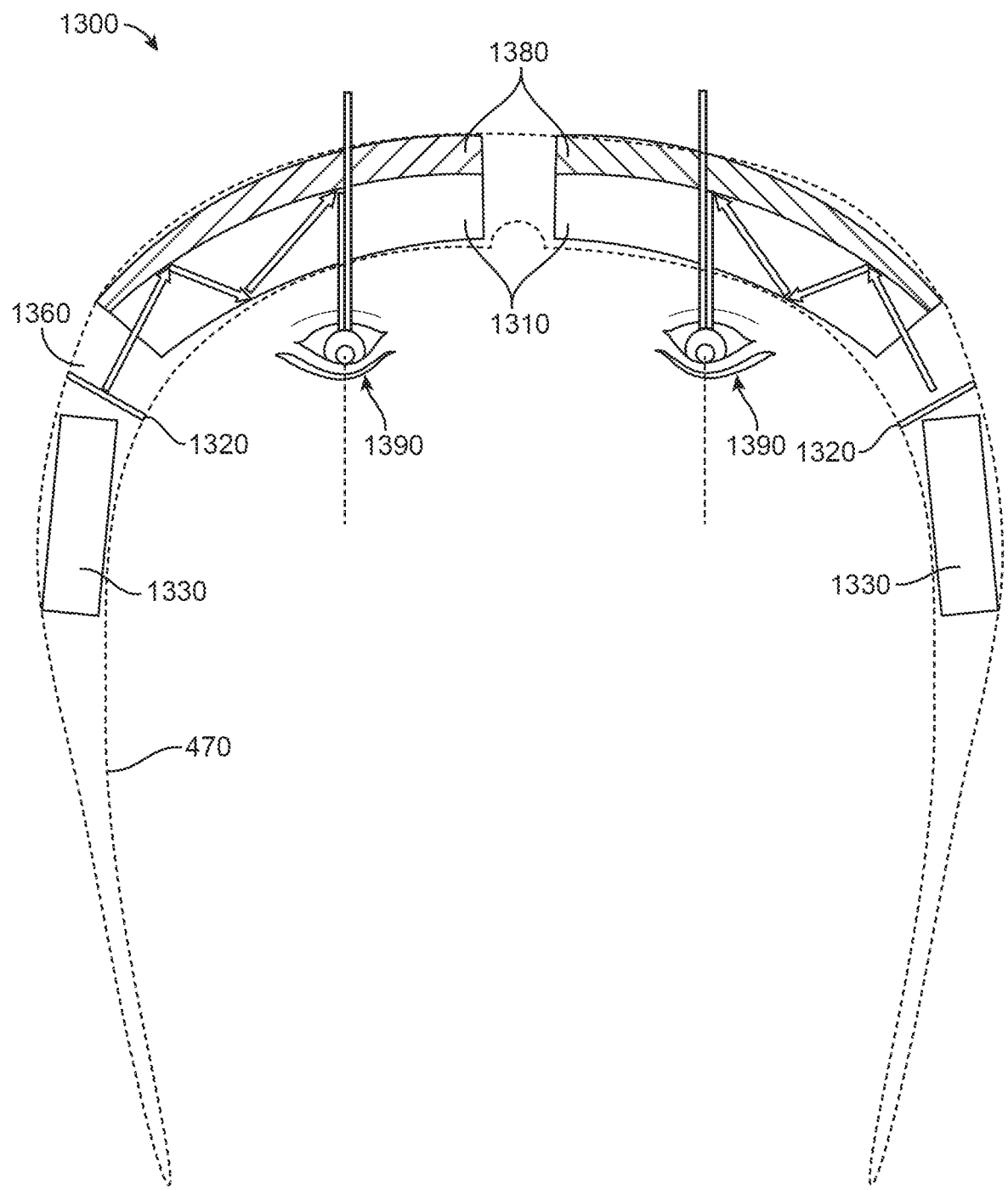
FIG. 13A illustrates a top view of some example components of a schematic representation of an optics system in one or more embodiments.
Figure 13B:
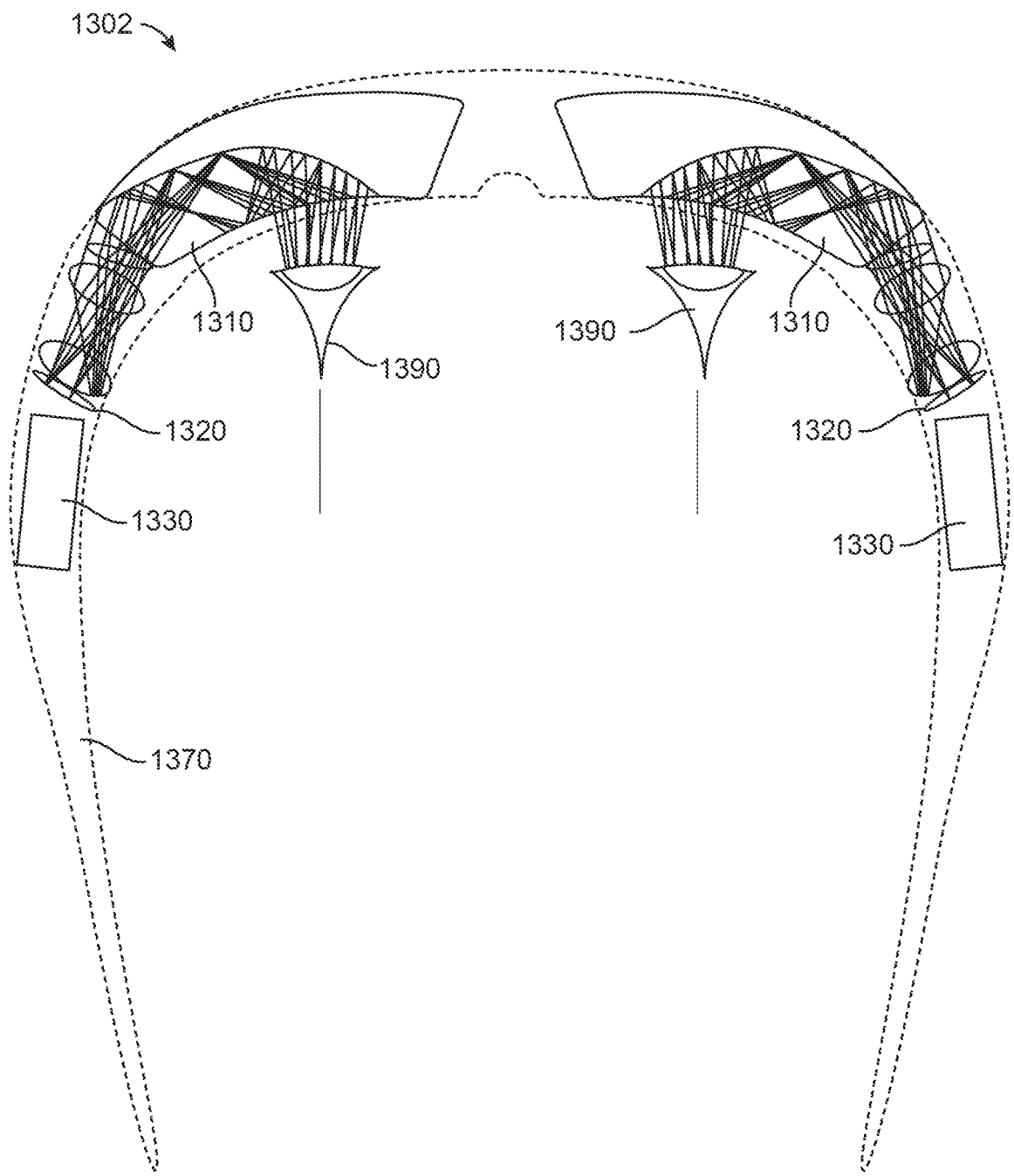
FIG. 13B illustrates an example embodiment of a schematic representation of an optics system in one or more embodiments.

As illustrated in FIGS. 13A-B, the light field generation subsystem (e.g., 1300 and 1302 respectively) is preferably operable to produce a light field. For example, an optical apparatus 1360 or subsystem may generate or project light to simulate a four-dimensional (4D) or five-dimensional (5D) light field that would be produced by light reflecting from a real three-dimensional object or scene. For instance, an optical apparatus such as a wave guide reflector array projector (WRAP) apparatus 1310 or multiple depth plane three-dimensional (3D) display system may generate or project multiple virtual depth planes at respective radial focal distances to simulate a 4D or 5D light field in some embodiments. In these embodiments, the optics system (12) functions as a near-eye light field generator and display of 4D or 5D light field by interpreting input images as two-dimensional (2D) slices of a 4D function that represents the light field. It shall be noted that FIGS. 13A-B may illustrate an optics system having a light field generation subsystem described herein in some embodiments or a stereoscopic virtual content generation subsystem that projects light beams corresponding to multiple depth planes to a user's eye(s) in some other embodiments.

In some embodiments, the optics system (12) renders stereoscopic representations of virtual contents to a user with image-based rendering that generates different views of a virtual content from a set of pre-acquired or pre-computed imagery. The virtual content may be blended or placed in an environment in which a user viewing the virtual content is located by using, for example, one or more of an environment map, a world map, a topological map (e.g., a map having point nodes representing respective locations and/or features and edges connecting nodes and representing one or more relations between connected nodes, etc.) In these embodiments, the optics system uses one or more display or rendering algorithms for image-based rendering that requires relatively modest (e.g., compared to generation of a light field for the same virtual content) computational resources, especially in real-time implementations of the virtual content. Moreover, the cost of interactions with the generated virtual content may be independent of the complexities of the virtual content. Moreover, the source of the images used in generating the virtual content may be real (e.g., photographs or video sequences of a physical object) or virtual (e.g., from one or more models).

These embodiments based on image-based rendering and one or more maps may be based on one or more fixed viewpoints (e.g., a viewpoint from which a set of images for rendering the imaged-based virtual content is acquired). Some of these embodiments use depth values (e.g., depth information acquired by a depth sensor or computed by localization techniques such as triangulation, etc.) to relax the fixed viewpoint limit by view interpolation. In these embodiments, the optics system (12) uses depth information (e.g., depth data for a smaller subset of pixels in an image or for each pixel in the image) for view interpretation in order to reproject points in, for example, the environment map (e.g., a geometric map having detailed geometric and/or geographical information of features, points, etc. in the map) relative to the user based on, for example, the location, the orientation, and/or the gaze direction of the user.

Some other embodiments using the image-based rendering and one or more maps relaxed the fixed viewpoint limit by determining corresponding point(s) and/or correspondences in a pair of images used for rendering the virtual content based at least in part upon the positions of the image sensor(s) capturing the pair of images. Both classes of embodiments with image-based rendering effectively generate and present virtual contents that may be perceived as stereoscopic by viewing users although there may exist situations where, for example, determining the correspondences between pair(s) of images may not necessarily be deterministically performed.

Some other embodiments thus generate a 4D or 5D light field with the optics system (12), rather than adopting the aforementioned image-based rendering. A light field may be generated with a 5D function (e.g., a 5D plenoptic function) and includes the radiance at a point in a given direction in a three-dimensional space. Therefore, a light field may include the 5D function that defines a set of spatial-angular images. In these embodiments where the radiance R at a point A having the coordinate (x, y, z) in space propagates along a direction D($\phi$,$\theta$) may have the form of R(x, y, z, $\phi$,$\theta$) where $\phi$ has a range of [0, $\pi$], inclusive, and $\theta$ has the range of [0, 2$\pi$], also inclusive. In this form, $\phi$ denotes the angle from the horizontal plane defined by the x-axis and y-axis; and $\theta$ denotes an angle between a vector connecting the point in the 3D space and the origin of the coordinate system and a reference unit vector (e.g., a unit vector along the x-axis).

In some embodiments, radiance is conserved in a medium (e.g., a transparent medium such as air). The above 5D function exhibits a certain amount of redundance due to radiance conservation. In these embodiments, the aforementioned 5D function representing the light field may be reduced to a 4D function R(x, y, $\phi$,$\theta$) when the optics system creates the 5D function in a surface (e.g., the plane z=0) and thus effectively reduces the 5D function having three spatial dimensions (x, y, z) and two angular dimensions ($\phi$,$\theta$) into a 4D function having two spatial dimensions (x, y) and two angular dimensions ($\phi$,$\theta$). Reducing the dimensionality of the light field function from a 5D function into a 4D function not only expediates the generation of the light field for virtual contents but also conserves computational resources.

In these embodiments, an optics system (12) described herein generate and present a light field for a virtual content to a user by computing the respective radiance of a plurality of points for the virtual content with the aforementioned 4D function (or 5D function in a more general application of the light field techniques). The computed radiance (or radiance flux) for a point includes data for the light emitted, reflected, transmitted, or received by the point and may be computed based on a per projected area basis. The radiance for a point may also include frequency and/or wavelength information and is directional as the radiance represents what the point representing a point (e.g., a pixel or a set of pixels) or a portion of the virtual content may be perceived by a user of the optics system (12). The radiance may be computed with any techniques such as parameterizing a line (e.g., a line from a user's eye to a point of a virtual content) by the point and a direction with orthographic image(s) or image(s) with a fixed field of view using homogeneous coordinates. For example, radiance of a point may be determined by using the light slab techniques that restrict the point for the virtual content and the point representing an eye of the user to lie with a respective convex quadrilateral and by mapping between the point of the virtual content (e.g., an image pixel of the virtual content) and the point representing an eye of a user with a linear projective map (e.g., a 3×3 matrix).

For example, an optics system (12) or the electronics (e.g., the aforementioned belt pack) may generate a light slab by rendering 2D array of images where each image represents a slice of the 4D light slab at a fixed plane and is formed by placing the center of the projection of a virtual camera at the sample location corresponding to the point of the virtual content by performing a sheared perspective projection that is substantially similar to that used to generate a stereo pair of images. In some embodiments, a light slab may be formed from a 2D array of orthographic views.

For generating and presenting a light field representation for a virtual content to a user via the optics system (12), a lens (e.g., 12a or 12b in FIG. 1) of the optics system (12) may include a stack of one or more planar or free-form waveguides where a waveguide may define one or more distinct focal planes that respectively correspond to one or more distinct focal distances. The stack of one or more planar or free-form waveguides may thus define a plurality of focal planes located at corresponding focal distances in some embodiments. A 2D slice of image may be rendered on a focal plane at a specific focal distance, and a set of 2D slices may thus be rendered at a plurality of focal planes to represent a virtual content that may then be perceived as stereoscopic by a user of the optics system.

In some embodiments, a waveguide may comprise an orthogonal pupil expansion (OPE) element associated with the first face of the planar optical waveguide for splitting the in-coupled light beam into a first set of orthogonal light beamlets, and a second orthogonal pupil expansion (OPE) element associated with the second face of the planar optical waveguide for splitting the in-coupled light beam into a second set of orthogonal light beamlets. In some embodiments, the first OPE element is disposed on the first face of the planar optical waveguide, and the second OPE element is disposed on the second face of the planar optical waveguide. The in-coupling element may be configured for optically coupling the collimated light beam from the image projection assembly as the in-coupled light beam for propagation within the planar optical waveguide via total internal reflection (TIR) along a first optical path that alternately intersects the first OPE element and the second OPE element, such that portions of the in-coupled light beam are deflected as the respective first set of orthogonal light beamlets and the second set of orthogonal light beamlets that propagate within the planar optical waveguide via TIR along second parallel optical paths. In this case, the second parallel optical paths may be orthogonal to the first optical path.

In some embodiments, the semi-reflective interfaces are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interfaces are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

In some embodiments, a waveguide may comprise an exit pupil expansion (EPE) element associated with the planar optical waveguide for splitting the orthogonal light beamlets into an array of out-coupled light beamlets (e.g., a two-dimensional out-coupled light beamlet array) that exit the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil.

In some embodiments, the EPE element is disposed on one of the first and second surfaces of the planar optical waveguide. The first set of orthogonal light beamlets and the second set of orthogonal light beamlets may intersect the EPE element, such that portions of the first set of orthogonal light beamlets and the second set of orthogonal light beamlets are deflected as the out-coupled light beamlet array out of the planar optical waveguide. In some embodiments, the EPE element is configured for imparting a convex wavefront profile on the out-coupled light beamlet array exiting the planar optical waveguide. In this case, the convex wavefront profile may have a center of radius at a focal point to produce an image at a given focal plane. In another embodiment, each of the IC element, OPE element, and EPE element is diffractive.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beamlet array) that exit a face of the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil. In some embodiments, the first thickness of the primary substrate and the second thicknesses of the secondary substrates are selected, such that spacings between centers of at least two adjacent ones of the out-coupled light beamlets are equal to or less than a width of the collimated light beam. In another embodiment, the first thickness and the second thicknesses are selected, such that no gap resides between edges of greater than half of adjacent ones of the out-coupled light beamlets.

In some embodiments, the semi-reflective interfaces are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interfaces are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a third aspect of the present disclosure, a virtual image generation system comprises a planar optical waveguide comprising a plurality of substrates including a primary substrate having a first thickness, at least one secondary substrate respectively having at least one second thicknesses, and at least one semi-reflective interface respectively disposed between the substrates.

The first thickness is at least twice each of the at least one second thickness. In some embodiments, the first thickness is a non-multiple of each of the second thickness(es). In another embodiment, the secondary substrate(s) comprises a plurality of secondary substrates. In this case, the second thicknesses may be equal to each other or two or more of the secondary substrate(s) may have second thicknesses that are not equal to each other. The first thickness may be a non-multiple of at least one of the second thicknesses. At least two of the unequal second thicknesses may be non-multiples of each other.

In some embodiments, each of the semi-reflective interface(s) comprises a semi-reflective coating, which may be, e.g., respectively disposed between the substrates via one of physical vapor deposition (PVD), ion-assisted deposition (IAD), and ion beam sputtering (IBS). Each of the coatings may, e.g., be composed of one or more of a metal (Au, Al, Ag, Ni—Cr, Cr and so on), dielectric (Oxides, Fluorides and Sulfides), and semiconductors (Si, Ge). In yet another embodiment, adjacent ones of the substrates are composed of materials having different indices of refraction.

The virtual image generation system further comprises an in-coupling (IC) element configured for optically coupling a collimated light beam from an image projection assembly for propagation as an in-coupled light beam within the planar optical waveguide. The image projection assembly may comprise a scanning device configured for scanning the collimated light beam. The semi-reflective interface(s) are configured for splitting the in-coupled light beam into a plurality of primary light beamlets that propagate within the primary substrate.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beamlet array) that exit a face of the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil. In some embodiments, the first thickness of the primary substrate and the second thickness(es) of the secondary substrate(s) are selected, such that spacings between centers of at least two adjacent ones of the out-coupled light beamlets are equal to or less than a width of the collimated light beam. In another embodiment, the first thickness and the second thickness(es) are selected, such that no gap resides between edges of greater than half of adjacent ones of the out-coupled light beamlets.

In some embodiments, the semi-reflective interface(s) are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interface(s) are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a fourth aspect of the present disclosure, a virtual image generation system comprises a pre-pupil expansion (PPE) element configured for receiving a collimated light beam from an imaging element and splitting the collimated light beam into a set of initial out-coupled light beamlets. The virtual image generations system further comprises a planar optical waveguide, an in-coupling (IC) element configured for optically coupling the set of initial out-coupled light beamlets into the planar optical waveguide as a set of in-coupled light beamlets, and one or more diffractive elements associated with the planar optical waveguide for splitting the set of in-coupled light beamlets into a set of final out-coupled light beamlets that exit a face of the planar optical waveguide. The diffractive element(s) may comprise an orthogonal pupil expansion (OPE) element associated with the planar optical waveguide for further splitting the set of in-coupled light beamlets into a set of orthogonal light beamlets, and an exit pupil expansion (EPE) element associated with the planar optical waveguide for splitting the set of orthogonal light beamlets into the set of final out-coupled light beamlets.

In some embodiments, the collimated light beam defines an entrance pupil, the set of initial out-coupled light beamlets define a pre-expanded pupil larger than the entrance pupil, and the set of final out-coupled light beamlets define an exit pupil larger than the pre-expanded pupil. In one example, the pre-expanded pupil is at least ten times larger than the entrance pupil, and the exit pupil is at least ten times larger than the pre-expanded pupil. In some embodiments, the set of initial out-coupled light beamlets is optically coupled into the planar optical waveguide as a two-dimensional light beamlet array, and the set of final out-coupled light beamlets exits the face of the planar optical waveguide as a two-dimensional light beamlet array. In another embodiment, the set of initial out-coupled light beamlets is optically coupled into the planar optical waveguide as a one-dimensional light beamlet array, and the set of final out-coupled set of light beamlets exits the face of the planar optical waveguide as a two-dimensional light beamlet array.

In some embodiments, the PPE element comprises a mini-planar optical waveguide, a mini-OPE element associated with the mini-planar optical waveguide for splitting the collimated light beam into a set of initial orthogonal light beamlets, and a mini-EPE element associated with the mini-planar optical waveguide for splitting the set of initial orthogonal light beamlets into the set of initial out-coupled light beamlets that exit a face of the mini-planar optical waveguide. The PPE may further comprise a mini-IC element configured for optically coupling the collimated light beam into the planar optical waveguide.

In another embodiment, the PPE element comprises a diffractive beam splitter (e.g., a 1×N beam splitter or a M×N beam splitter) configured for splitting the collimated light beam into an initial set of diverging light beamlets, and a lens (e.g., a diffractive lens) configured for re-collimating the initial set of diverging light beamlets into the set of initial out-coupled light beamlets.

In still another embodiment, the PPE element comprises a prism (e.g., a solid prism or a cavity prism) configured for splitting the collimated light beam into the set of in-coupled light beamlets. The prism may comprise a semi-reflective prism plane configured for splitting the collimated light beam into the set of in-coupled light beamlets. The prism may comprise a plurality of parallel prism planes configured for splitting the collimated light beam into the set of in-coupled light beamlets. In this case, the parallel prism planes may comprise the semi-reflective prism plane. The plurality of parallel prism planes may comprise a completely reflective prism plane, in which case, a portion of the collimated light beam may be reflected by the at least one semi-reflective prism in a first direction, and a portion of the collimated light beam may be transmitted to the completely reflective prism plane for reflection in the first direction. The prism may comprise a first set of parallel prism planes configured for splitting the collimated light beam into a set of initial orthogonal light beamlets that are reflected in a first direction, and a second set of parallel prism planes configured for splitting the initial orthogonal light beamlets into the set of in-coupled light beamlets that are reflected in a second direction different from the first direction. The first and second directional may be orthogonal to each other.

In yet another embodiment, the PPE element comprises a first planar optical waveguide assembly configured for splitting the collimated light beam into a two-dimensional array of out-coupled light beamlets (e.g., an N×N light beamlet array) that exits a face of the first planar optical waveguide assembly, and a second planar optical waveguide assembly configured for splitting the two-dimensional out-coupled light beamlet array into multiple two-dimensional arrays of out-out-coupled light beamlets that exit a face of the second planar optical waveguide assembly as the set of in-coupled light beamlets. The first and second planar optical waveguide assemblies may respectively have unequal thicknesses.

The two-dimensional out-coupled light beamlet array has an inter-beamlet spacing, and the multiple two-dimensional out-coupled light beamlet arrays are spatially offset from each other by an inter-array spacing different from the inter-beamlet spacing of the two-dimensional out-coupled light beamlet array. In some embodiments, the inter-array spacing of the multiple two-dimensional out-coupled light beamlet arrays and the inter-beamlet spacing of the two-dimensional out-coupled light beamlet array are non-multiples of each other. The inter-array spacing of the multiple two-dimensional out-coupled light beamlet arrays may be greater than the inter-beamlet spacing of the two-dimensional out-coupled light beamlet array.

In some embodiments, the first planar optical waveguide assembly comprises a first planar optical waveguide having opposing first and second faces, a first in-coupling (IC) element configured for optically coupling the collimated light beam for propagation within the first planar optical waveguide via total internal reflection (TIR) along a first optical path, a first exit pupil expander (EPE) element associated with the first planar optical waveguide for splitting the collimated light beam into a one-dimensional light beamlet array that exit the second face of the first planar optical waveguide, a second planar optical waveguide having opposing first and second faces, a second IC element configured for optically coupling the one-dimensional light beamlet array for propagation within the second planar optical waveguide via TIR along respective second optical paths that are perpendicular to the first optical path, and a second exit pupil expander (EPE) element associated with the second planar optical waveguide for splitting the one-dimensional light beamlet array into the two-dimensional light beamlet array that exit the second face of the second planar optical waveguide. In this case, the first face of the second planar optical waveguide may be affixed to the second face of the first planar optical waveguide. The first and second planar optical waveguides may respectively have substantially equal thicknesses.

The second planar optical waveguide assembly may comprise a third planar optical waveguide having opposing first and second faces, a third IC element configured for optically coupling the first two-dimensional light beamlet array for propagation within the third planar optical waveguide via TIR along respective third optical paths, a third EPE element associated with the third planar optical waveguide for splitting the two-dimensional light beamlet array into a plurality of two-dimensional light beamlet arrays that exit the second face of the third planar optical waveguide, a fourth planar optical waveguide having opposing first and second faces, a fourth IC element configured for optically coupling the plurality of two-dimensional light beamlet arrays for propagation within the fourth planar optical waveguide via TIR along respective fourth optical paths that are perpendicular to the third optical paths, and a fourth EPE element associated with the fourth planar optical waveguide for splitting the plurality of two-dimensional light beamlet arrays into the multiple two-dimensional light beamlet arrays that exit the second face of the fourth planar optical waveguide as the input set of light beamlets. In this case, the first face of the fourth planar optical waveguide may be affixed to the second face of the third planar optical waveguide, and first face of the third planar optical waveguide may be affixed to the second face of the second planar optical waveguide. The first and second planar optical waveguides may respectively have substantially equal thicknesses, and the third and fourth planar optical waveguides may respectively have substantially equal thicknesses. In this case, the substantially equal thicknesses of the first and second planar optical waveguides may be different from the substantially equal thicknesses of the third and fourth planar optical waveguides. The equal thicknesses of the third and fourth planar optical waveguides may be greater than the equal thicknesses of the first and second planar optical waveguides.

The optical apparatus 1360 in the form of a WRAP apparatus 1310 or multiple depth plane 3D display system may, for instance, project images into each eye of a user, either directly or indirectly. When the number and radial placement of the virtual depth planes is comparable to the depth resolution of the human vision system as a function of radial distance, a discrete set of projected depth planes mimics the psycho-physical effect that is produced by a real, continuous, three-dimensional object or scene. In one or more embodiments, the system 1300 may comprise a frame 1370 that may be customized for each AR user. Additional components of the system 1300 may include electronics 1330 (e.g., some or all of the electronics illustrated in FIG. 12) to connect various electrical and electronic subparts of the AR system to each other.

The system 1300 may further comprise a microdisplay 1320 that projects light associated with one or more virtual images into the waveguide prism 1310. As shown in FIG. 13A, the light produced from the microdisplay 1320 travels within the waveguide 1310, and some of light reaches the user's eyes 1390. In one or more embodiments, the system 1300 may further comprise one or more compensation lenses 1380 to alter the light associated with the virtual images. FIG. 13B illustrates the same components as FIG. 13A, but illustrates how light from the microdisplays 1320 travels through the waveguides 1310 to reach the user's eyes 1390.

It should be appreciated that the optical apparatus 1360 may include a number of linear wave guides, each with a respective series of deconstructed curved spherical reflectors or mirrors embedded, located or formed within each of the linear wave guides. The series of deconstructed curved spherical reflectors or mirrors are designed to refocus infinity-focused light at specific radial distances. A convex spherical mirror can be used to produce an output spherical wave to represent a virtual point source which appears to be located at a defined distance behind the convex spherical mirror.

By concatenating in a linear or rectangular wave guide a series of micro-reflectors whose shapes (e.g., radii of curvature about two axes) and orientation together, it is possible to project a 3D image that corresponds to a spherical wave front produced by a virtual point source at a particular x, y, z coordinate. Each of the 2D wave guides or layers provides an independent optical path relative to the other wave guides, and shapes the wave front and focuses incoming light to project a virtual depth plane that corresponds to a respective radial distance. With a plurality of 2D wave guides each providing a focal plane at a different focal depth, a user viewing the projected virtual depth planes experiences a 3D effect.

It is appreciated that features and aspects of the various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

Various example embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosures. All such modifications are intended to be within the scope of claims associated with this disclosure.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allows for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

The above description of illustrated embodiments is not intended to be exhaustive or to limit the embodiments to the precise forms disclosed. Although specific embodiments of and examples are described herein for illustrative purposes, various equivalent modifications may be made without departing from the spirit and scope of the disclosure, as will be recognized by those skilled in the relevant art. The teachings provided herein of the various embodiments may be applied to other devices that implement VR, AR, MR, XR, or hybrid systems and/or which employ user interfaces, not necessarily the example optics systems (12) generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples may be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, may be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information may be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information may be embodied in any computer-readable medium for use by or in connection with an instruction execution system, apparatus, or device, such as a computer-based system, processor-containing system, or other system that may fetch the instructions from the instruction execution system, apparatus, or device and execute the instructions associated with logic and/or information.

In the context of this specification, a "computer-readable medium" may be any element that may store the program associated with logic and/or information for use by or in connection with the instruction execution system, apparatus, and/or device. The computer-readable medium may be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein may be performed with variations. For example, many of the methods may include additional acts, omit some acts, and/or perform acts in a different order than as illustrated or described.

The various embodiments described above may be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments may be modified, if necessary, to employ systems, circuits and concepts of the various patents, applications and publications to provide yet further embodiments.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above may be combined to provide further embodiments. Aspects of the embodiments may be modified, if necessary, to employ concepts of the various patents, applications and publications to provide yet further embodiments.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A hinge system, comprising:
   a hinge base fixedly couplable to a first member;
   an intermediate hinge member rotatably coupled to the hinge base to rotate about a pitch axis; and
   a distal hinge member rotatably coupled to the intermediate hinge member to rotate about a yaw axis and fixedly couplable to a second member,
   wherein the hinge system enables the second member to pitch and yaw relative to the first member,
   wherein the hinge base includes a biasing member configured to rotationally bias the intermediate hinge member about the pitch axis toward a neutral configuration when the intermediate hinge member is displaced from the neutral configuration, and
   wherein the hinge base comprises a generally planar structure with an internal cavity that accommodates the biasing member.

2. The hinge system of claim 1, wherein the hinge base includes a bushing aligned with the pitch axis, and the intermediate hinge member is pivotably mounted about the bushing to pitch up and down about the pitch axis, and
   wherein clearance is provided between the bushing and the intermediate hinge member to enable some translational displacement of the intermediate hinge member relative to the hinge base.

3. The hinge system of claim 1, wherein the hinge base and the intermediate hinge member of the hinge system include one or more stop arrangements to limit rotational travel of the intermediate hinge member relative to the hinge base about the pitch axis, and
   wherein the one or more stop arrangements comprise a first rotational stop provided on the hinge base that is configured to impede a path of the intermediate hinge member when the intermediate hinge member pitches up to an upward limit and a second rotational stop provided on the hinge base that is configured to impede the path of the intermediate hinge member when the intermediate hinge member pitches down to a downward limit.

4. The hinge system of claim 3, wherein the first and second rotational stops are provided by portions of an arcuate slot provided in the hinge base that impede a path of the intermediate hinge member when the intermediate hinge member pitches up and down to the upward limit and the downward limit, respectively.

5. The hinge system of claim 3, wherein the one or more stop arrangements comprise a first rotational stop provided on the intermediate hinge member that is configured to abut the hinge base when the intermediate hinge member pitches up to an upward limit and a second rotational stop provided on the intermediate hinge member that is configured to abut the hinge base when the intermediate hinge member pitches down to a downward limit.

6. The hinge system of claim 5, wherein the first and second rotational stops are provided by peripheral edges of the intermediate hinge member, and
   wherein the first and second rotational stops serve as backup stops in the event of failure of primary rotational stops provided by the base hinge.

7. The hinge system of claim 1, wherein the hinge base includes arcuate guides and the intermediate hinge member includes or interacts with corresponding guide pins that ride in the arcuate guides of the hinge base as the intermediate hinge member rotates relative to the hinge base about the pitch axis, and
   wherein clearance is provided between a profile of the arcuate guides and the corresponding guide pins to enable some translational displacement of the intermediate hinge member relative to the hinge base.

8. The hinge system of claim 1, wherein the hinge systems are configured to enable the second member to pitch up and down from a neutral configuration at least five degrees in each rotational direction about the pitch axis.

9. The hinge system of claim 1, wherein the hinge systems are configured to enable the second member to pitch up and down from a neutral configuration at least ten degrees in each rotational direction about the pitch axis.

10. The hinge system of claim 1, wherein a biasing member is positioned between the distal hinge member and the intermediate hinge member to bias the distal hinge member toward a neutral configuration.

11. The hinge system of claim 1, wherein the intermediate hinge member and the distal hinge member of the hinge system include one or more stop arrangements to limit rotational travel of the distal hinge member relative to the intermediate hinge member about the yaw axis.

12. The hinge system of claim 11, wherein the one or more stop arrangements comprise a first rotational stop provided on the intermediate hinge member that is configured to impede a path of the distal hinge member when the distal hinge member yaws to an outward limit and a second rotational stop provided on the intermediate hinge member that is configured to impede the path of the distal hinge member when the distal hinge member yaws to an inward limit, and
   wherein the first and second rotational stops are provided by opposing portions of a plate structure of the intermediate hinge member that impede the path of the distal hinge member when the distal hinge member yaws to the outward limit and the inward limit, respectively.

13. The hinge system of claim 11, wherein the one or more stop arrangements comprise a first rotational stop provided on the distal hinge member that is configured to abut the intermediate hinge member when the distal hinge member yaws to an outward limit and a second rotational stop provided on the distal hinge member that is configured to abut the intermediate hinge member when the distal hinge member yaws to an inward limit.

14. The hinge system of claim 13, wherein the first and second rotational stops are provided by distinct portions of the distal hinge member that are configured to abut opposing sides of the intermediate hinge member.

15. The hinge system of claim 1, wherein the hinge system is configured to enable the second member to yaw at least fifteen degrees.

16. The hinge system of claim 1, wherein the hinge system is configured to enable the second member to yaw outwardly at least twenty degrees.

17. A hinge system, comprising:
   a hinge base fixedly couplable to a first member;
   an intermediate hinge member rotatably coupled to the hinge base to rotate about a pitch axis; and
   a distal hinge member rotatably coupled to the intermediate hinge member to rotate about a yaw axis and fixedly couplable to a second member,
   wherein the hinge system enables the second member to pitch and yaw relative to the first member,
   wherein the hinge base includes a biasing member configured to rotationally bias the intermediate hinge member about the pitch axis toward a neutral configuration when the intermediate hinge member is displaced from the neutral configuration, and
   wherein the hinge base comprises a generally planar base element with the biasing member integrally formed therein.

18. The hinge system of claim 17, wherein the hinge base further comprises opposing covers fixedly secured to the generally planar base element to substantially conceal the biasing member within an internal cavity of the hinge base, and
   wherein at least one of the opposing covers includes an arcuate guide to assist in guiding the intermediate hinge member as the intermediate hinge member rotates relative to the hinge base about the pitch axis.

* * * * *